May 9, 1967 — R. R. WELLS — 3,318,517
AUDIENCE REACTION MEASURING SYSTEM
Filed March 1, 1965 — 8 Sheets-Sheet 1
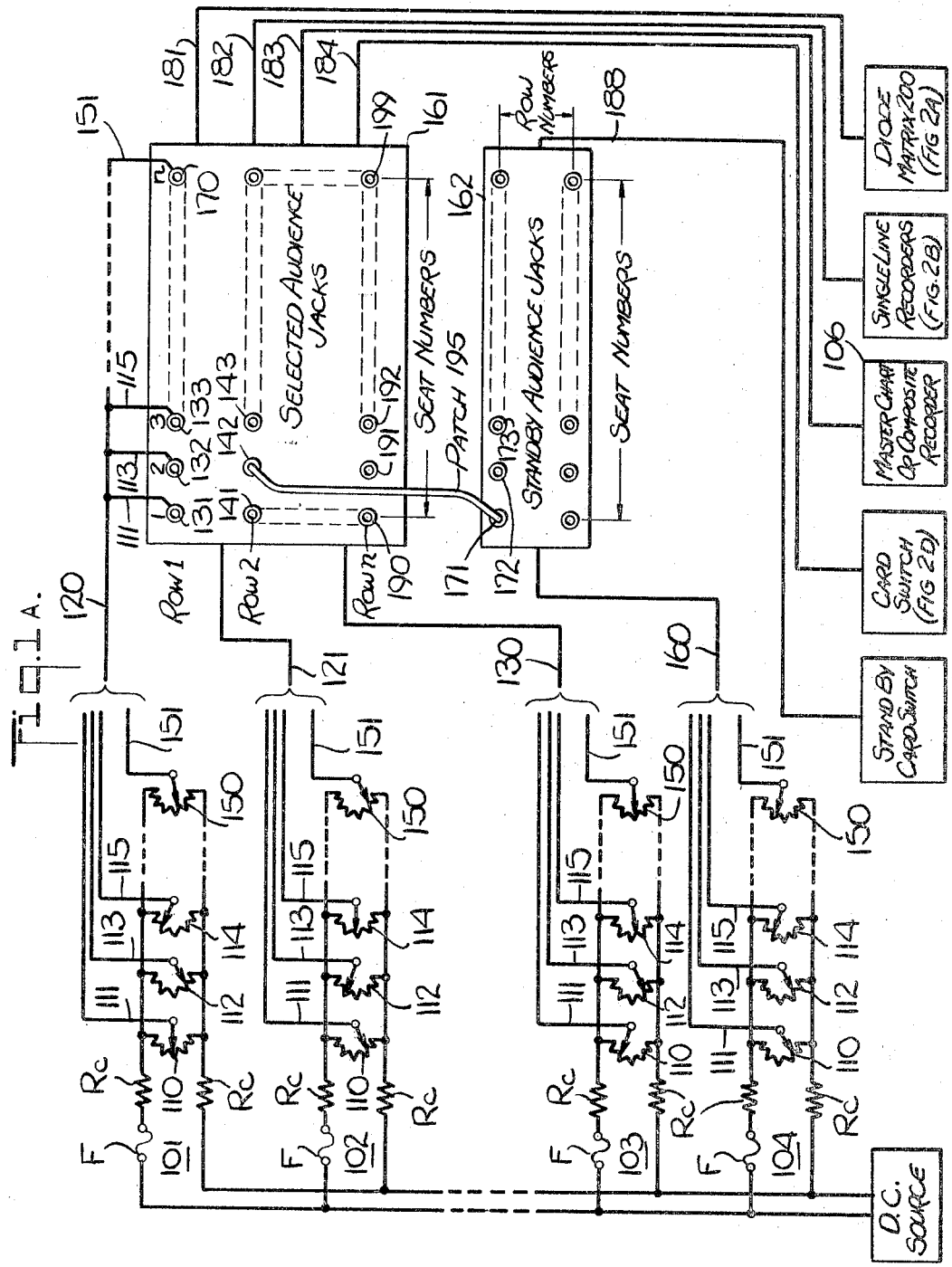
INVENTOR.
RALPH R. WELLS
BY Kenyon & Kenyon
ATTORNEYS

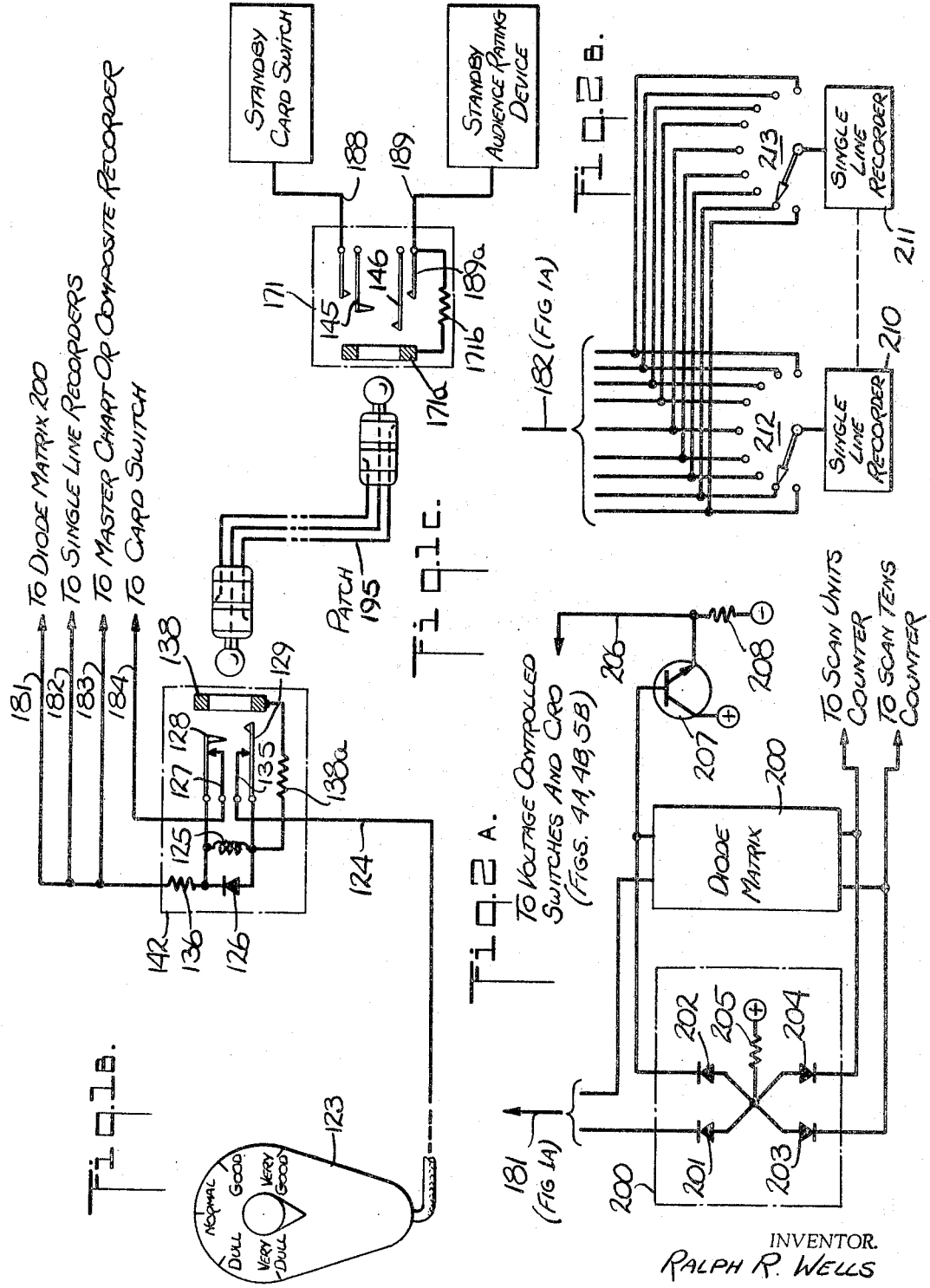

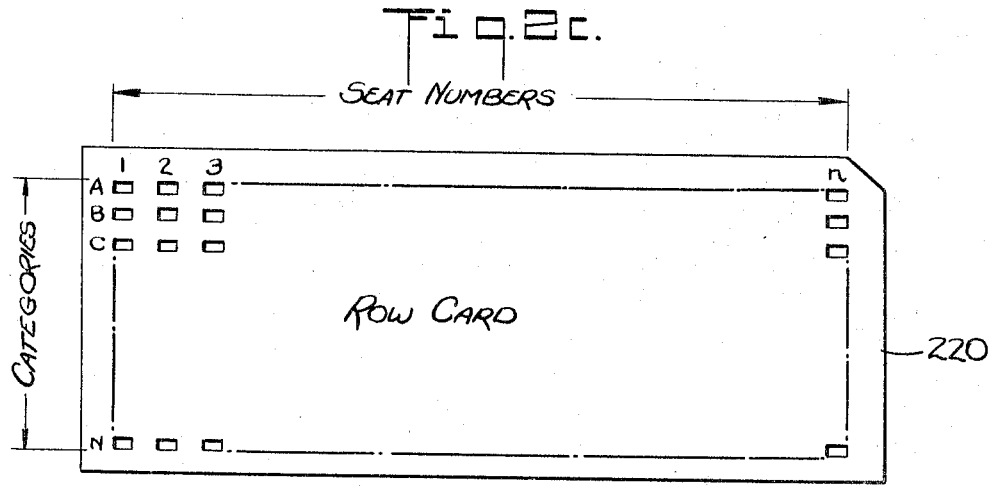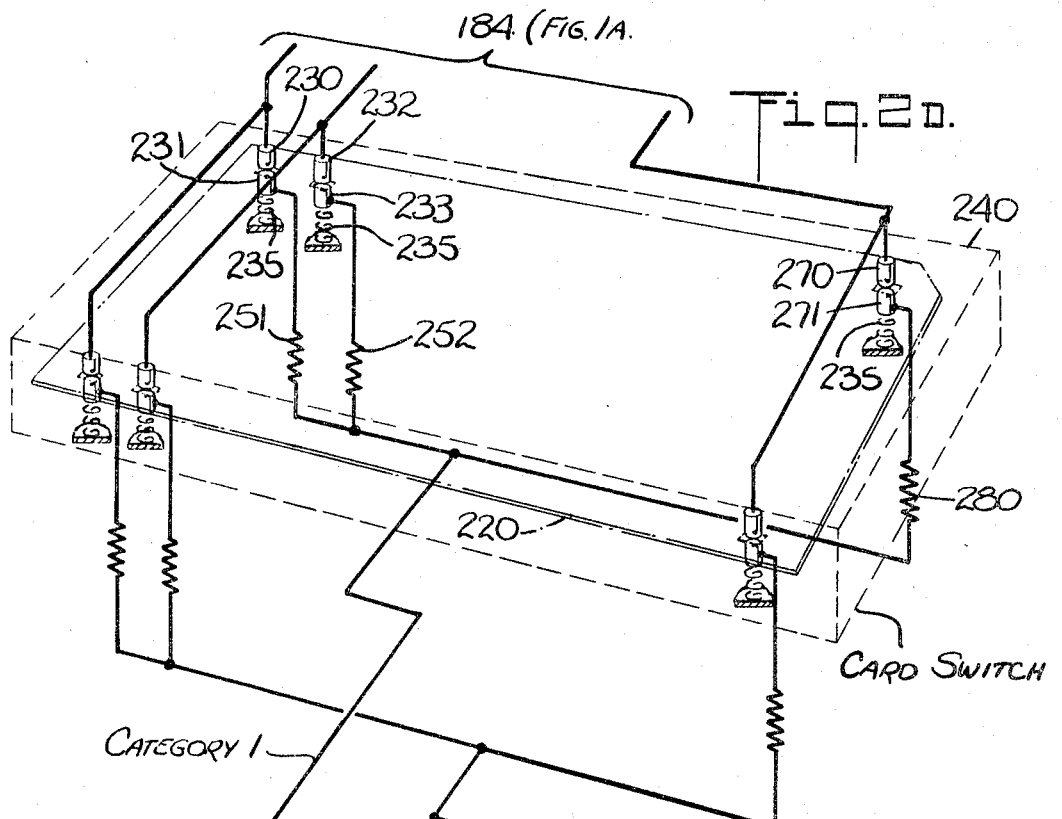

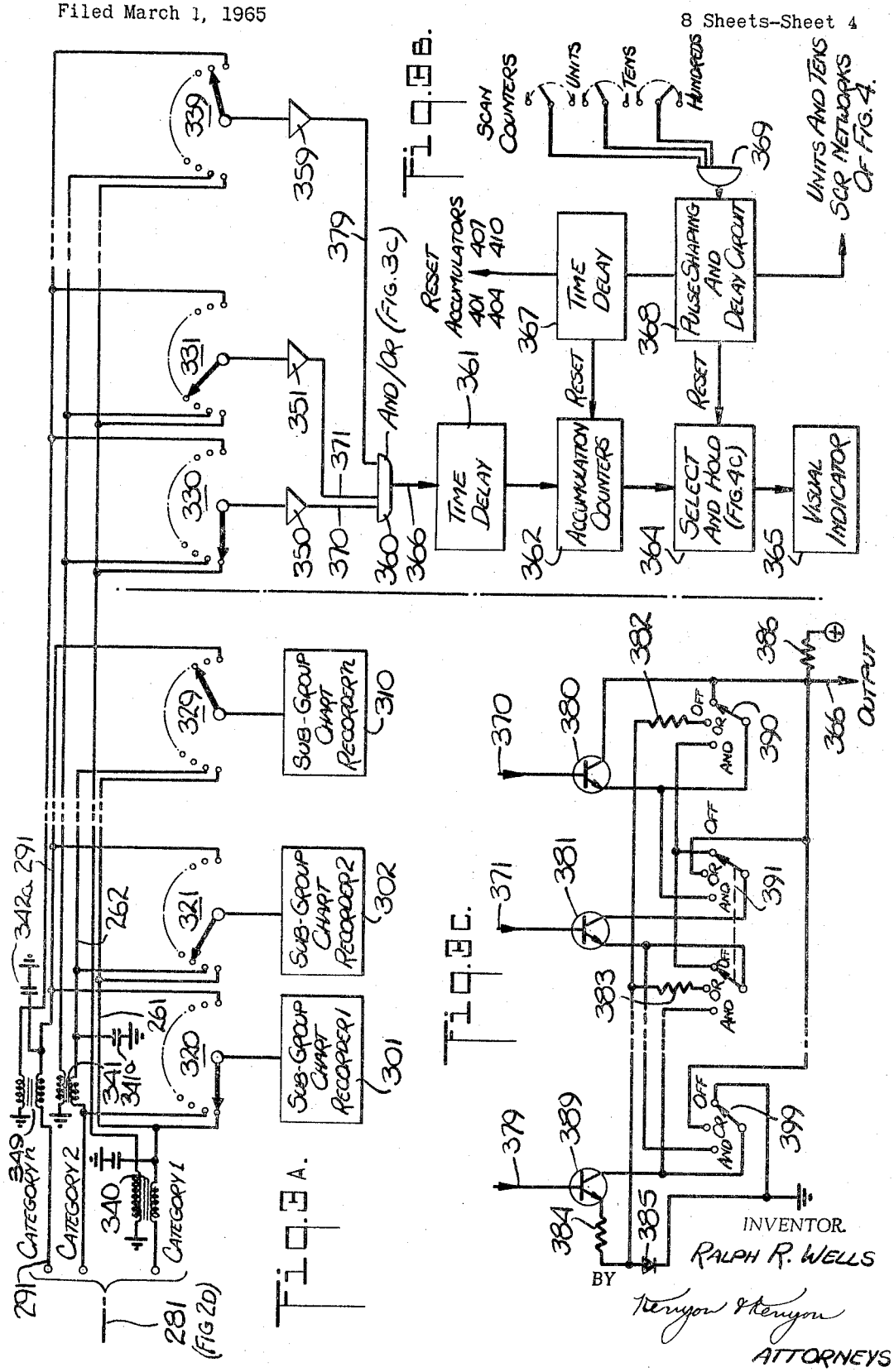

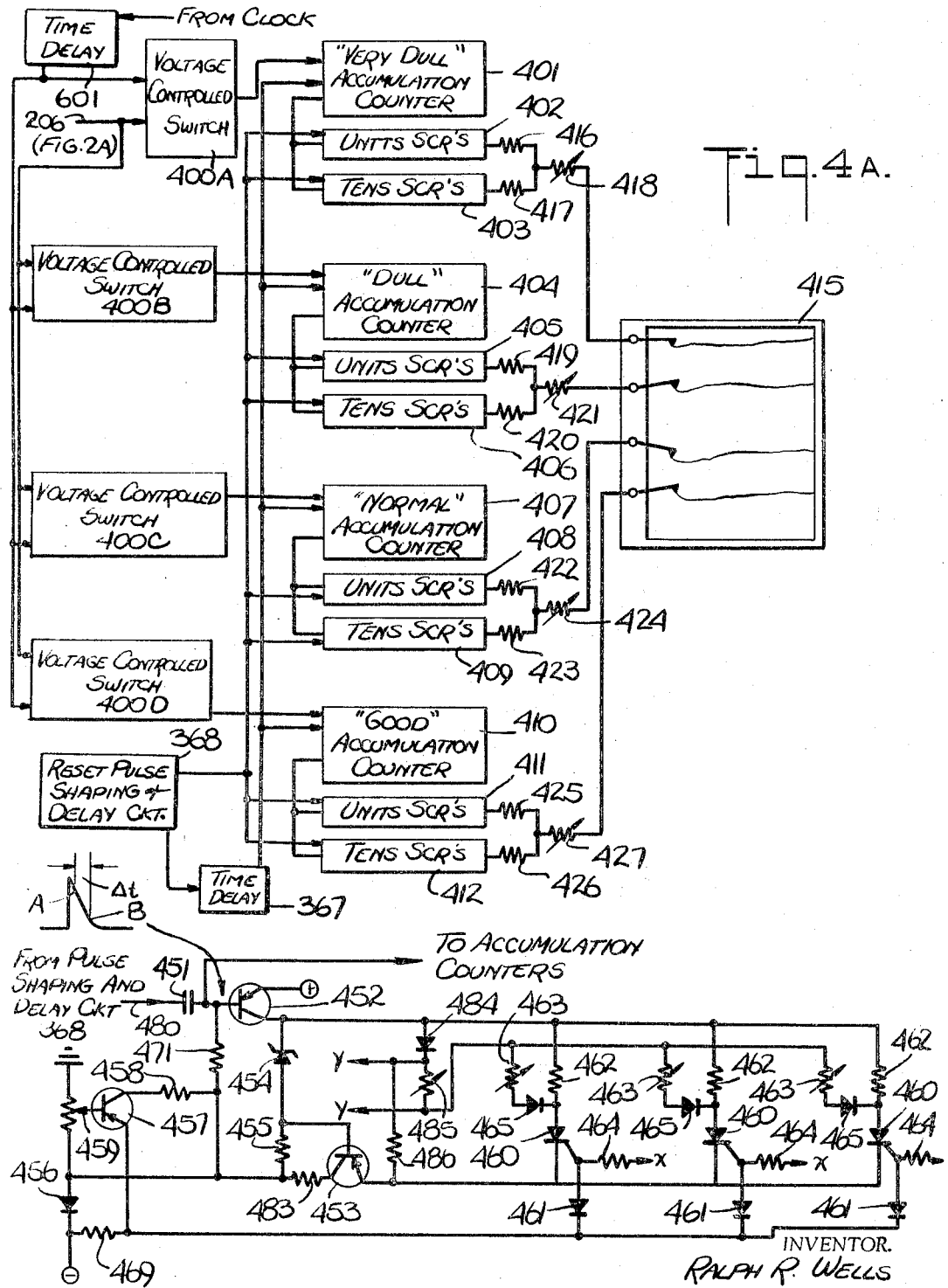

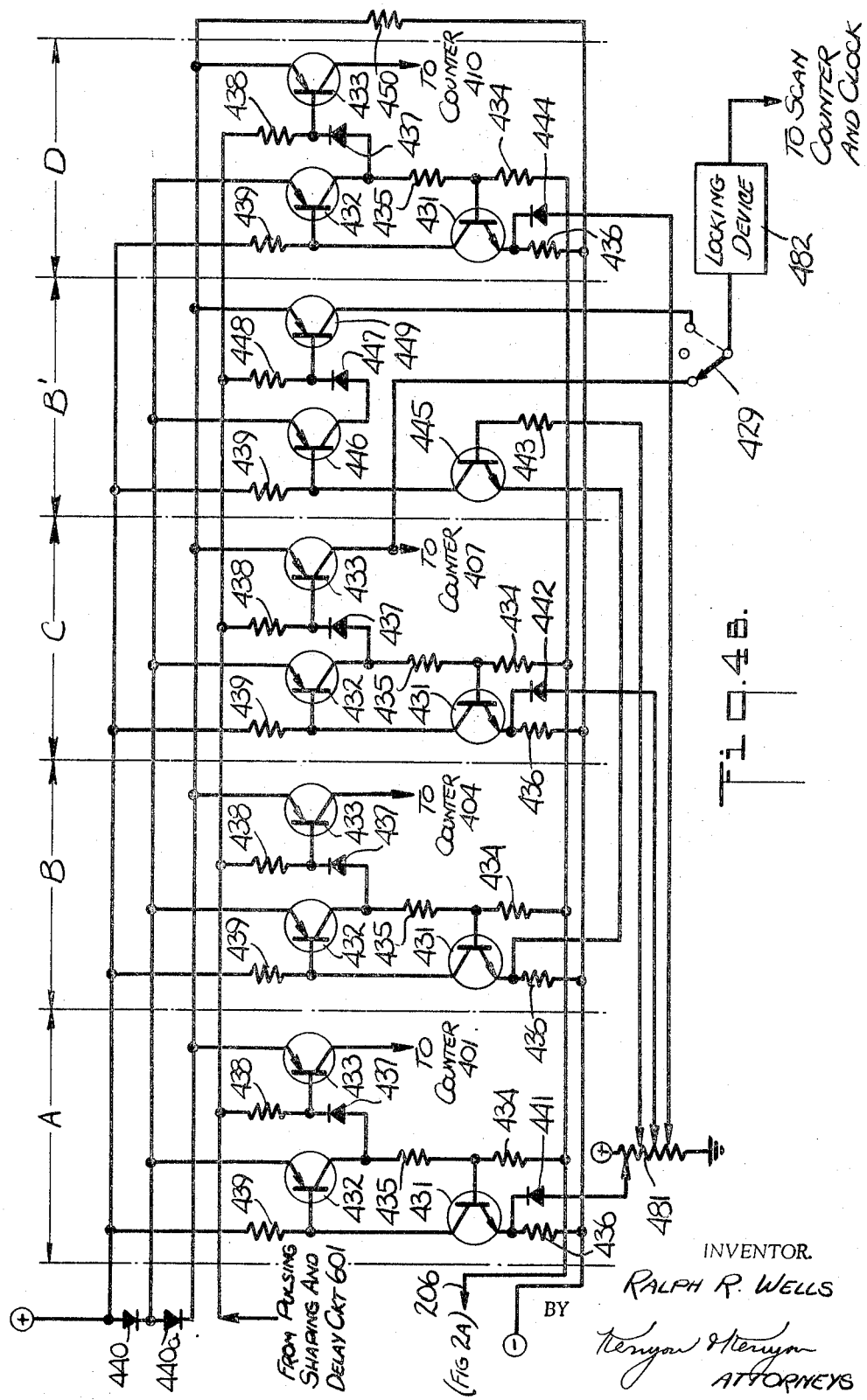

May 9, 1967 R. R. WELLS 3,318,517
AUDIENCE REACTION MEASURING SYSTEM
Filed March 1, 1965 8 Sheets-Sheet 7

INVENTOR.
RALPH R. WELLS
BY
Kenyon & Kenyon
ATTORNEYS

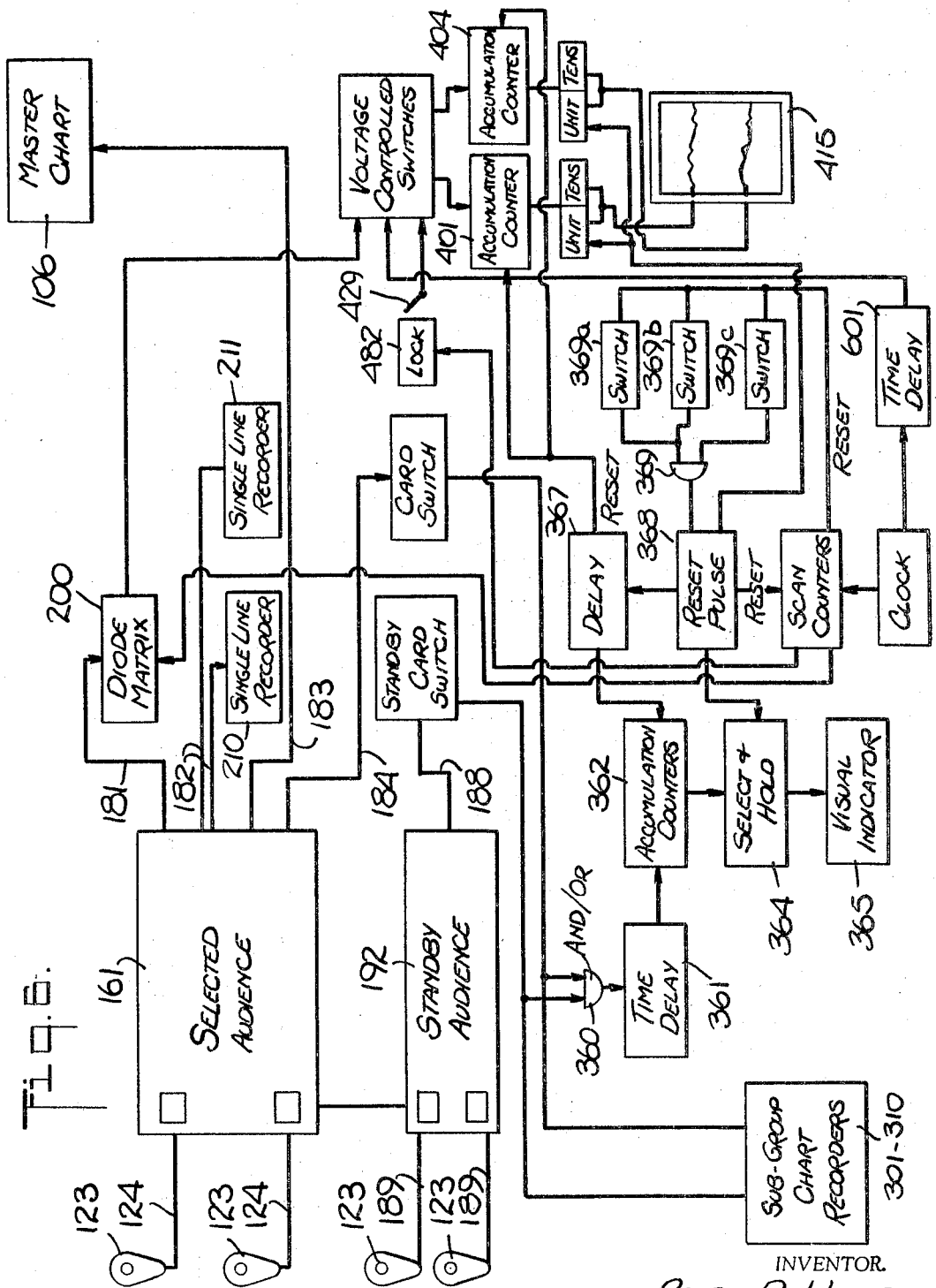

United States Patent Office 3,318,517
Patented May 9, 1967

3,318,517
AUDIENCE REACTION MEASURING SYSTEM
Ralph R. Wells, Van Nuys, Calif., assignor, by mesne assignments, to Screen Gems, Inc., New York, N.Y., a corporation of Delaware
Filed Mar. 1, 1965, Ser. No. 436,046
21 Claims. (Cl. 235—52)

This invention relates to data processing apparatus and more particularly to arrangements for automatically sensing, displaying, separating, and recording audience reaction to any desired subject.

Indications or evaluations of public reaction to a given performance or consumer product prior to commercial production are becoming increasingly and significantly important in view of the large expenditures ultimately involved in the given production or product. Among the great number of problems encountered in deriving such evaluations perhaps the most formidable are those of quickly, easily, and preferably, automatically categorizing the audience into specific subgroups so that the reactions of these subgroups, at whom the performance or product is frequently aimed, can be evaluated. For any given performance or product, for example, it may be desired to categorize the audience into subgroups on the basis of age, educational level, sex, etc. Both to provide a complete statistical analysis and to establish a reference level, it is usually also desired to evaluate the overall audience reaction in addition to the reactions of the various subgroups. The indication of the overall audience reaction may then be compared with the reaction of any desired subgroup and, in the case of a subgroup whose reaction is likely to be biased for one reason or another, the effect of the subgroup of and on the overall reaction may be determined.

The early evaluation systems include audience applause and laughter sound measuring devices, many of which are still presently used in connection with "live" performances. These systems were found to be inadequate in three respects: first, subgroup analysis was not possible; secondly, reactions such as fear, disgust, and suspense were not measurable; and, thirdly, the system is deceptive in the presence of either an overly or underly demonstrative audience.

Subsequent audience reaction systems attempted to alleviate at least a portion of the foregoing shortcomings by soliciting audience reactions in form of written questionnaires. Since the questionnaires are often completed at the end of a performance, they are retrospective and tend to lose their spontaneity. Such reaction systems also suffer the disadvantages of uncooperative or confused members of the audience, fatigue, and illegible handwriting, all of which introduce statistical error. Although subgroup analysis is possible with this system, the tabulation of the analysis is of necessity extremely slow, relatively expensive, and hence inefficient.

Other audience reaction system comprise electrical arrangements to sense and record the audience reaction. The majority of these systems have no provision for subgroup recording and only measure the average reaction of the audience. These systems suffer the disadvantages of all averaging systems, such as the sound systems noted heretofore, and lack provisions for subgroup analysis. As noted earlier, the ability of an audience reaction system to quickly analyze any one of a number of subgroup reactions is paramount in modern reaction systems, which in addition to this versatility, must also insure statistical accuracy.

In the few prior electrical systems capable of subgroup analysis it is necessary to evaluate the audience either visually or by questionnaires and then manually categorize the desired subgroups, usually by complex interconnections on a telephone switchboard type plugboard. Such a process is inherently both unreliable and confusing, and thus leads to the inevitable human errors which destroy statistical accuracy. Perhaps the greatest disadvantage of such a system, however, is the delay incurred while the rating devices are being prepared for the evaluations. This delay often causes annoyance and confusion among the audience members and in turn leads to uncooperativeness, be it willing or unwilling. This uncooperativeness is, of course, fatal to statistical accuracy in a comprehensive evaluation system wherein maximum effectiveness of subgroup categorization is desired.

It is, therefore, an object of this invention to provide an audience reaction system wherein the reactions of an individual member, any desired combination of categorized subgroups, or the whole of the audience, may be evaluated with an optimum degree of statistical accuracy.

A closely related object is to do so both automatically and with maximum subgroup categorization versatility.

Yet another closely related object is to provide statistical subgroup analysis simply and inexpensively.

It is yet a further object to monitor the whole and subgroup portions of the audience to detect absent, confused, or uncooperative audience members and easily replace or eliminate these members from the evaluation to insure statistical accuracy.

In accordance with these objects a feature of the invention resides in the use of category or row cards which are punched so as to contain the personal, or category information of each member of a given group of the audience as, for example, a row. The cards are then inserted in card or selection switches, which are an integral part of the overall reaction system, to simply, inexpensively, and automatically provide both subgroup categorized and composite audience reactions.

A second feature of the invention is the versatility in which the reactions of the members of the subgroup categories "screened" by the card switch may, either individually or as a composite, be evaluated.

A further feature of the invention is the manner in which a visual indication of the number of selected audience members in each subgroup may be obtained so that, upon an indication that a subgroup contains only a statistically insufficient number of selected audience members, members of a standby audience may easily, and with minimal chance of error be substituted for the selected audience members. The statistical integrity of the system is thus insured.

Yet another feature is found in the ability and adaptability of the subgroup apparatus to check the overall system without the need for additional and expensive checking equipments. The checking is accomplished simply and inexpensively by incorporating an inductor and diode with the circuit associated with the rating device of each member of the selected audience.

Still another feature resides in the manner in which the overall or composite reaction of the audience may be recorded and the ease in which the reaction of the audience toward a specific event can be determined.

Another feature is the ease in which a specific member of the audience who is temporarily absent or whose reaction is of interest, either because he is confused, uncooperative, or overly demonstrative, may be located.

Other objects and features of the present invention will become apparent upon consideration of the following detailed description when taken in conjunction with the accompanying drawings in which:

FIG. 1A illustrates the overall distribution of the audience rating devices to members of the audience, the prewired connection of these devices to selected and standby audience plugboard panels, and the distribution of the outputs of these panels to the circuits of the other figures;

FIG. 1B illustrates an audience reaction device;

FIG. 1C illustrates the circuitry associated with each jack on the pluboards of FIG. 1A, respectively;

FIG. 2A is a schematic representation of the diode matrix associated with each jack on the selected audience plugboard panel of FIG. 1A;

FIG. 2B illustrates the switching system and the single line recording apparatus associated with the outputs of the panel of FIG. 1A;

FIGS. 2C and 2D illustrate the card switch and associated card which is used to automatically categorize the audience into desired subgroups;

FIG. 3A is a switching and recording system by which the reaction of any of the desired subgroups, or a composite of desired subgroups, may be recorded;

FIG. 3B illustrates the system for determining both the total number of audience members and the number of audience members in any desired group or subgroup combination;

FIG. 3C illustrates the AND/OR gate which may be employed in FIG. 3B;

FIG. 4A is a block diagram of the counting and recording system of the ratings of the audience;

FIG. 4B is a schematic diagram of the circuitry of the voltage controlled switches of FIG. 4A;

FIG. 4C is a schematic diagram of the select and hold circuit of FIG. 3B and the units and tens silicon controlled rectifier circuits of FIG. 4A;

FIG. 6 is a block diagram of the system of the invention.

Figure 5A:
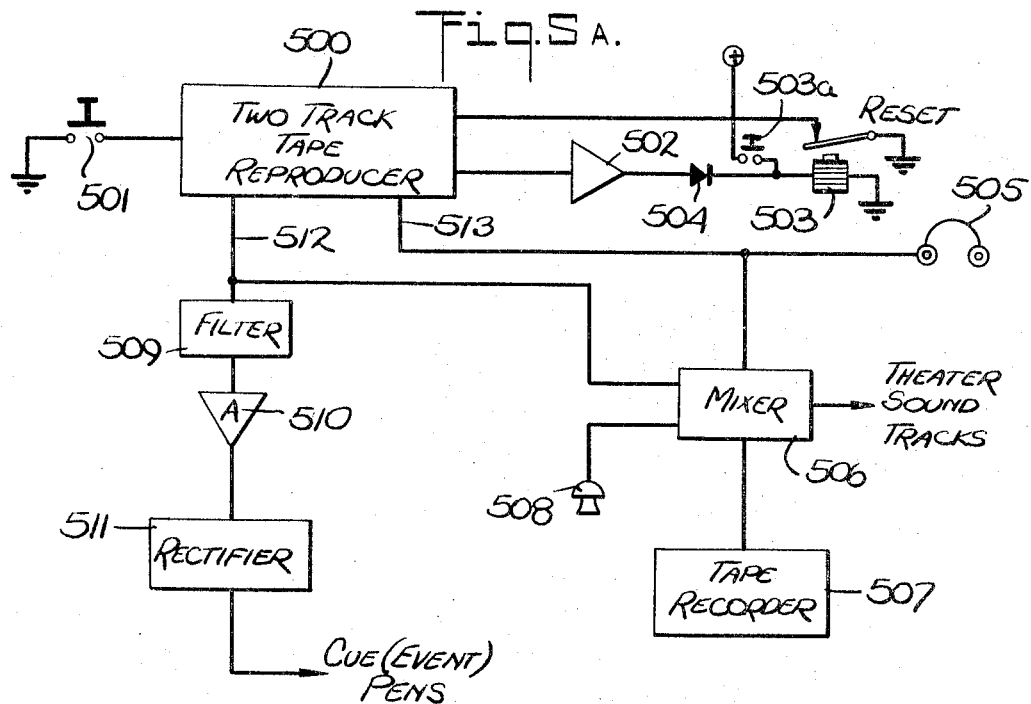
FIG. 5A illustrates a system by which the indications of the occurrence of the events of the performance being evaluated may be inserted in the composite recording of FIG. 4A.

It should be noted at this point that the first digit of the reference numeral given to each component in each figure of the drawings corresponds to the figure number wherein that component made its first appearance.

FIG. 1A of the drawing illustrates the overall distribution of audience rating devices to each member of the reviewing audience and the prewired connection of the devices to a prewired plugboard panel at a control or data accumulation center. FIG. 1B of the drawing illustrates the face of the rating device given to each member of the audience. The rating device is nothing more than a potentiometer mounted in a case 123 that is human engineered to fit comfortably into the palm of the hand. The wiper terminal of the potentiometer is mechanically coupled to an indicator or pointer 122 which is manually adjusted by each member of the audience to record or rate his reaction. The reactions may be indicated by any suitable subjective rating scale with the indications "very dull," "dull," "normal," "good," and "very good" shown in FIG. 1B of the drawing for illustrative purposes only.

As can be seen from FIG. 1A, the potentiometers in any random group, for example all the people in each row of the audience, have their end terminals connected in parallel with the whole network being serially connected through compensating resistors $R_C$ to a common D.C. source 100. Each group in turn may comprise any desired number of individual rating devices, as shown by potentiometers 110, 112, 114, through 150 in group 101 of FIG. 1A. There will be a series of selected audience groups which may aso have any desired number of audience members, as illustrated by groups or rows 102 and 103 and potentiometers 110, 112, 114, through 150 in FIG. 1A. For reasons which will be discussed hereinafter it is also desirable to have at least one standby group of audience members 104, which may also comprise any given number of members as illustrated by potentiometers 110, 112, 114, through 150 in standby group 104 of FIG. 1A. The compensating resistors $R_C$ are necessary to electrically balance the potentials appearing across each group of potentiometers so that for a given subjective rating all the potentiometer wiper arm voltage outputs will be the same. It should be understood that although potentiometers are shown as an illustrative device which provides a varying voltage output in accordance with the subjective rating of the individual member of the audience, any one of a similar number of devices may be substituted therefor, without departing from the spirit and scope of the invention.

The rating measuring or wiper arms 111, 113, 115, through 151 of each of rating measuring devices 110, 112, 114, through 150 in each of the selected audience groups 101, 102, and 103 are in turn connected via cables 120, 121, 130, and 160 to the individual jacks on prewired selected audience plugboard 161. The standby audience rating devices 110, 112, 114, through 150 of group 104 are connected via cable 160 to the standby audience jacks in prewired plugboard 162. For ease in relating the information of the category cards to the rating devices for reasons which will become apparent hereinafter, the appearance of the jacks on each of panels 161 and 162 can correspond to the seating arrangements of the audience, with each seat and hence each jack, having a distinctive, i.e., unduplicated, number. To facilitate this arrangement both the selected and standby audience plugboards 161 and 162 may be arranged so that the horizontal appearance of the jacks may, for example, correspond to the seat numbers while the vertical appearance of the jacks may correspond to the row numbers. Since the cables from the audience rating devices are prewired to the jacks on the backs of the panels, the face of the plugboard is completely uncluttered by patches and a member of the standby audience may be quickly and easily inserted in the place of the member of the selected audience with only a minimal chance of error, as discussed in greater detail hereinafter. In addition, a plurality of switches can be employed to facilitate the insertion of other inputs, such as classification data for subgroup information. This simplicity, ease, and greater versatility represents a marked improvement over the cluttered and unruly plugboards which were thought to be necessary in prior art audience reaction systems wherein subgroup analysis was desired.

As noted heretofore, the availability of a standby audience is desirable to insure statistical accuracy. For example, if a member of a selected audience group of 100, which might be chosen to make it statistically easy to calculate directly in terms of percentages, were to temporarily leave the audience to visit a rest room, a one percent error in the result would be introduced; if five members were to leave, the error rises to five percent, and so on. Error could also be introduced by uncooperative, confused, illiterate, etc. audience members. To insure elimination of these sources of error the present reaction measuring system allows a member of the standby audience to be substituted for a member of the selected audience, without the knowledge of either member, upon the occurrence of events such as those noted. As discussed in detail hereinafter, the present invention also detects absent, uncooperative, confused, or illiterate members of the audience, again without their knowledge, so that a member of the standby audience may be substituted therefor. The substitution is made quickly and easily by a conventional telephone switchboard type plugboard patch such as patch 195 from standby jack 171 of standby audience panel 162 to selected audience jack 142 on selected audience panel 161, the latter of which represents the absent or uncooperative audience member. As discussed heretofore, since the plugboards are uncluttered by patches from each rating device appearance on one panel to another subgroup panel this substitution is quickly and easily made, with only a minimal chance of error.

The mechanics of the above-described patch by which a member of the standby audience is substituted for a member of the selected audience is easily seen by reference to FIG. 1C which is representative of the manner in which such a substitution may be made. As can be seen by the numerical designations on the dotted enclosures, the jack shown in the dotted enclosure on the left in FIG. 1C represents selected audience jack 142 while the jack shown in the dotted enclosure on the right represents standby audience jack 171. Patch 195 connects these jacks. Cable 124 connects the wiper arm of the potentiometer of the audience member rating device 123 of FIG. 1B with the break contact 135 of jack 142. The spring contacts 128 and 129 of jack 142 are interconnected by the shunt combination of inductor 125 and diode 126. Under normal conditions, i.e., in the absence of a patch such as 195, the audience reaction signal is transmitted from break contact 135 through the shunt combination of inductor 125 and diode 126 to spring contact 128, and then through isolating resistor 136 to output cables 181, 182, and 183, and through break contact 127 to output cable 184.

When patch 195 is inserted, spring contact 146 of standby jack 171 is connected by contact 189a via cable 189 to the rating device of a member of the standby audience. At the same time, spring contact 145 is connected by contact 188a via cable 188 to a standby card or selection switch which automatically detects which of the desired subgroup categories the standby audience member falls into, as discussed hereinafter in connection with the reactions of the selected audience members.

When the plug of patch cord 195 is inserted into selected audience jack 142, make contacts 127 and 135 are broken. The circuit from the rating device input of the undesirable selected audience member through make contact 135 is thus broken from each of the data accumulation circuits connected to each of output cables 181, 182, 183 and 184. The insertion of the patch cord plug into standby audience jack 171 closes the circuit from springs 145 and 146 to the normally open contacts connected to cables 188 and 189, and thus effectively connects the rating device and category information of the standby audience member via patch 195 in place of the absent or undesired selected audience member. The voltage representing the standby audience member's rating is thus transmitted from his rating device via cable 189 through spring 146, patch 195, spring 129, the shunt combination of inductor 125 and diode 126, springs 128 and resistor 136 to output cables 181, 182 and 183. The rating voltage is also transmitted via cable 189, through the normally open contact 189a, through spring contact 146, to the spring contact 129 of jack 142 via patch 195, through the shunt combination of the inductor 125 and diode 126 associated with jack 142, through spring contact 128, via patch 195 to spring contact 145 of jack 171, and through the normally open contact 188a via cable 188 to the standby card or selection switch. The output of the selector switch is connected to the card switch of the selected audience, as discussed hereinafter. It should be noted that not only the rating but also subclass information of a member of the standby audience is thus substituted for a member of the selected audience by the use of one patchcord.

A resistor 138a having low impedance is connected between sleeve 138 and spring contact 129 of jack 142 in FIG. 1C. A similar low impedance resistor, resistor 171b, is also connected between sleeve 171a and spring make contact 189a. Prior to substituting a rating device 123 of one of the selected audience with one from the standby audience it is possible, for example, that the rating device of the standby audience is set at the "Very Good" position. At the same time, the rating device of the selected audience to be replaced could be set at "Very Dull." With these conditions, the connecting of patch 195 could cause a short circuit when the tip of the plug contacts the shell. The provision of resistors 138a and 171b enable a recorder to be connected to the sleeve portion for monitoring an individual. These resistors also prevent a short circuit whenever the patch cords are inserted or withdrawn. Since the resistors are of low impedance, they do not appreciably affect the signal level.

As illustrated in FIG. 1A of the drawing, the output of panel 161 comprises four cables, namely, cable 181, which is connected to the diode matrix 200 shown on FIG. 2A; cable 182, which is connected to the recorder shown on FIG. 2B; cable 183, which is connected to a conventional master chart or composite recorder 106 which may be any such compatible recorder; and cable 184, which is connected to the card switch shown on FIG. 2C. Each of the individual circuits of FIGS. 2A, 2B, 2C, and 2D are discussed individually in detail hereinafter.

It should be noted that although a prewired patchboard is shown in FIG. 1A, the patchboard could be replaced by related devices such as, for example, a rotary or crossbar switch or a pinboard.

Each jack of the selected audience panel of FIG. 1A is connected by an individual conductor in cable 181 to an individual diode matrix 200, such as the one illustrated in FIG. 2A. For ease of explanation only the matrix connected to a single conductor representing the reaction of one member of the audience is illustrated in FIG. 2A. It should be understood, however, that each jack in the selected audience panel has a conductor attached thereto (prewired) which, in turn, is connected through cable 181 to an individual diode matrix identical to the one illustrated by diodes 201, 202, 203 and 204 in FIG. 2A.

The diode matrix of FIG. 2A is basically a four diode gate wherein the anode electrodes of each of diodes 201, 202, 203, and 204 are connected to a common point, which is in turn connected through a relatively high impedance 205 to a source of positive potential. The source of positive potential may be any available multipotential source such as source 100 of FIG. 1A. The cathode electrode of diode 201 is connected through an individual conductor in cable 181 to an individual selected audience jack, as discussed heretofore, while the cathode of diode 202 is connected to the base of impedance matching transistor 207. The collector of transistor 207 is connected to a source of positive potential such as, for example, that of multipotential source 100. The emitter of transistor 207 is connected through resistor 208 to a source of negative potential which again may be, for example, multipotential source 100. The emitter electrode of transistor 207 also connected by output conductor 206 to the voltage controlled switches of FIG. 4 and the cathode ray oscilloscope of FIG. 5B, as discussed in greater detail hereinafter. The cathodes of diodes 203 and 204 are connected to a master scan counter which comprises a tens counter and a units counter, respectively, which may be any such counter as, for example, the one shown in FIG. 5 of the copending U.S. patent application of J. C. Rice and R. R. Wells, Ser. No. 181,080, filed Mar. 20, 1962. For present purposes, it appears sufficient to note that the cathode of diode 203 could be connected to a tens leg such as the tens leg 114 of the FIG. 5 counter in the noted copending application, and the cathode of diode 204 could be connected to a units leg of the counter such as leg 94 of FIG. 5 of the same application. The master scan counter, as in the case of the noted counter of the co-pending application, should be capable of applying a series of pulses to sequentially activate each of the diode matrices. It appears sufficient to note here that, as also discussed in the co-pending application, the master scan counter has a clock (FIG. 8) associated therewith to drive the scan counter sequentially so that at least one pulse is delivered for every member of the selected audience. The scan counter and clock include stop and reset features which are discussed in detail hereinafter.

Since the number of diode matrices corresponds to the number of selected audience jacks, the master scan counter will then be required to deliver a number of sequential pulses, with each pulse corresponding to the seat number of each member of the selected audience. For each seat under 100 the combination of a tens and units signal is necessary. FIG. 2A illustrates a situation where only a 100 (zero through 99) selected audience members are desired for a given study. However, if it is desired to study a selected audience having more than 100 members, the counter could easily be expanded by adding an identical hundreds stage and adding a third diode similar to diodes 203 and 204 to the diode matrix gate 200. A similar process would be followed if selected audience members numbering in thousands were desired. Conventional manual switches could then be added by one having ordinary skill in the art to bypass the matrices not used as, for example, on a rainy night when only a small number of people are in the audience or whenever a small audience is to be surveyed. As shall be apparent from the following discussion, the clock and master scan counter would also have to be modified in a like manner.

Since the cathode of diode 201 is normally connected by a conductor in cable 181 to an individual jack on the selected audience panel and from there to an individual selected audience rating device, the voltage appearing at the cathode of the diode is minimally at ground potential, and is usually at a positive potential above ground, with the exact potential depending upon the subjective rating indicated by the individual member of the audience. Diode 201 is therefore normally back-biased since its cathode potential will usually be more positive than its anode potential. The potential appearing at the cathode electrodes of diodes 203 and 204 is normally less positive than the potential applied to the common junction point of the anode electrodes of diodes 203 and 204 via resistor 205 from the positive source, hence these diodes are normally conductive. The potential appearing at the cathode electrode of diode 202 is normally more positive with respect to the potential at the common anode electrode so that this diode is normally nonconductive.

As the scan counter sequentially "counts," each of the diode matrices are sequentially activated when a tens and units signal corresponding to the particular matrix is delivered. In the matrix 200 illustrated, the coincidence of the tens and the units signals causes diodes 203 and 204 to be back-biased out of conduction, which in turn causes the potential at the common junction of the anode electrodes of each of the diodes to rise to a potential more positive than the potential appearing at the cathode electrodes of diodes 201 and 202. Since the magnitude of the potential appearing at the cathode electrode of diode 201 is the potential due to the rating of the audience member associated with the particular diode matrix, the magnitude of the current flow through this diode is a measure of the audience reaction. The current flow through diode 201 in turn varies the magnitude of the current flow through diode 202 in such a manner as to transmit a signal corresponding to the audience rating through the diode matrix to the base of the emitter follower transistor 207. Transistor 207 is thus sequentially biased by the output signal from each of the diode matrices 200 and in turn causes an output to appear on conductor 206. Since the degree of conduction through the transistor 207 determines the magnitude of the output and the degree of conduction of the transistor depends upon the magnitude of the rating signal transmitted from the diode matrices, the magnitude of the output on conductor 206 corresponds to the ratings of individual audience members.

The output of transistor 207 is a voltage which, due to time multiplexing, may come out as a pulse. If, for example, the inputs of all of rating device 123 were the same, the output of transistor 207 would be a continuous D.C. voltage. On the other hand, if the clock is stopped and thereby ceases to time multiplex, the output is again a sustained voltage. These output signals on conductor 206 are then transmitfted via conductor 206 to the voltage controlled switches of FIG. 4 and the cathode ray oscilloscope of FIG. 5B for evaluation, as discussed in detail hereinafter. It should be noted that the audience ratings are thus being effectively transmitted sequentially from the rating devices, through each of the diode matrices, an impedance matching stage, and onto a common output conductor 206 to provide ready access to the individual subjective ratings of the audience members on a high-speed time division basis.

In accordance with the flexibility and enormous statistical selectivity advantages of the present invention, it is also possible, as an ancillary feature, to record selected individual responses. This feature is provided by connecting each of the selected audience jacks of panel 161 of FIG. 1A via cable 182 to an individual appearance on one or more of a plurality of mechanical switches such as those illustrated by switches 212 and 213 in FIG. 2B. It should be obvious that the number of appearances on each switch, and the number of switches required, would depend only upon the size of the selected audience. The switches could be any such conventional switches, either manual or automatic, for example, a crossbar switch with the contacts interconnected in any desired individual or composite manner to yield a particular result. The output of each of the switches would be in turn connected to a single line recorder 210 or 211 which again may be any such conventional recorder capable of being adapted to this use.

The use of a pair of recorders 210 and 211 rather than a single recorder is advantageous for several reasons. First, and perhaps most apparent, the capacity of the system to record reaction signals of individual audience members is increased by a multiple of the number of recorders employed, and second, fidelity of transmission through the whole or any part of the system may be easily determined for purposes of detecting malfunctions and the like by simply connecting one recorder to the input and one recorder to the output of the apparatus to be checked, and measuring the accuracy with which the latter recorder tracks the former. Only a pair of recorders 210 and 211 are shown, for illustrative purposes. As is obvious (as indicated in the drawing) any number of such recorders may be used depending upon the amount of information which it is desired to record. Somewhat less obvious, the recorders could be connected directly to the presently unconnected sleeve portion of each jack, such as sleeve 138 of jack 142 in FIG. 1C, to record the desired information directly without changing the normal functions of the jack discussed heretofore.

As noted heretofore, the final cable connected to each of the selected audience jacks of panel 161 is cable 184, which is connected to the card switch 240 shown on FIG. 2D. Before the operation of the card switch 240 of FIG. 2D can be understood it is first necessary to discuss the cards which carry the category information that controls the operation of the card switch. A typical card which might be used to record certain personal data of each member of the audience in a given group, for example, a row, for categorical subgroup purposes is shown in FIG. 2C.

As noted, in statistically computing audience reaction it is often desirable to categorize the members of the audience into specific subgroups in order to efficiently utilize the data accumulated. At the same time it is desirable that maximum personal information concerning each member of the audience be obtained to enable maximum subgroup categorization. This personal information should be recorded in as simple a form as possible for optimum utility and ease of handling. The row card illustrated by FIG. 2C accomplishes all of these objectives. The row card 220 of FIG. 2C may be any such card wherein holes may be inserted or punched to indicate categorical subgroup information. For example, the card 220, which is used for illustrative purposes only, has a variety of perforations which may or may not be punched. The card holes which are or are not punched represent the information obtained from each audience member in a selected group, such as all of those in a given row. As illustrated in FIG. 2C, the horizontal appearance could, for example, correspond to seat numbers 1, 2 . . . , while the vertical appearances correspond to categories a, b, c . . . , e.g., females under 35, use electric razors, married, sex, etc. As each member of the audience is seated an attendant, such as the usher, could easily and quickly acquire the desired information and record the information by simply punching or not punching certain holes in the card. A single card would then contain all the desired information on each person in the row.

Card 220 would then be collected with the other cards and inserted in an individual slot in the card switch 240 wherein the data is automatically processed simultaneously with the audience reactions. The end view of card 220 is shown in FIG. 2D of the drawing inserted in card switch 240.

As shown in FIG. 2D, each row of the card switch 240 contains a number of upper and lower contacts or feelers, the exact number of which corresponds to the number of rows and categories in the card 220, i.e., there will be two contacts for each possible hole in the card 220. The bottom row of contacts 231, 233, through 271 are mounted on springs 235. In the view shown in FIG. 2D the contacts 230 and 231 are prevented from electrically contacting with each other by an unpunched hole in the card 220. Contacts 232 and 233 are, however, in contact because of the pressure exerted by spring 235 on contact 233 and due to the fact that the card is punched for that row, seat number, and category. It should be remembered that the signal or information appearing on contacts 230, 232, through 270 corresponds to a voltage magnitude which is indicative of the subjective rating of a single member of the audience. This signal has in turn been transmitted from the rating device, through selected audience panel 161, and to the card switch. This subjective reaction signal is, in turn, now transmitted "through" card 220 from contact 232 to contact 233, through isolating or summing resistor 252 and category bus 262 to the subgroup recorders and count-the-house indicator of FIGS. 3A and 3B, respectively, as discussed in detail hereinafter. Resistors 251, 252, through 280 are summing or integrating resistors.

As noted heretofore, each row of the audience may have a card which is inserted in a card switch 240 and, in the manner discussed for a single card or row heretofore, the information concerning the ratings of audience members in certain categories as indicated by punched holes in the card, is passed through summing resistors 251, 252, through 280 to the category buses 261, 262, through 291. It should be noted that it is not necessary to initially categorize the audience and then reseat them so that their rating as a group can be ascertained, but rather that the whole process of collecting the ratings and categorizing the audience into desired subgroups is automatic and without the danger of untruthful answers to avoid embarrassment by the members of the audience. Moreover, it is not necessary to collect the data, visually examine it and then categorize the audience into desired subgroups by complicated and error-prone "patching" between various patchboards. The present invention automatically achieves a complete, thorough, and accurate statistical subgroup breakdown which has heretofore not been possible.

The category bus outputs of the standby card switch, which is functionally and structurally the same as the card switch discussed in connection with FIGS. 2C and 2D, are connected to the corresponding category bus outputs of the card switch 240. It should be remembered that, as discussed in connection with FIG. 1C, the signals corresponding to the ratings of the standby audience members are transmitted to the standby card switch only when a member of the standby audience is substituted for a member of the selected audience, and hence will not appear on the category buses at any other time. The signals on the category buses thus represent the subjective ratings of members of the audience in desired categorical subgroups which are connected via cable 281 to the subgroup recorders and the count-the-house indicator of FIGS. 3A and 3B, respectively.

It should be understood that although category cards and card switches are used in the foregoing description for illustrative purposes, the present invention also contemplates the use of other compatible devices known to the art such as, for example, switches responsive to punched tapes.

As can be seen from FIG. 3A, each of the category buses 261, 262, through 291 is connected to individual appearances on mechanical switches 321, 322, through 329. The output of these switches are in turn individually connected to each of subgroup chart recorders 301, 302, through 310. The subgroup ratings may thus be permanently recorded. Switches are provided so that the recorders may be freely alternated to provide useful and convenient comparisons between categories quickly by simply changing a switch. The simplicity of the arrangement thus allows a great degree of flexibility even while the evaluations are being conducted and further emphasizes the flexibility and completeness of the overall system. It should be obvious to one skilled in the art that the number of terminals on each switch and number of switches required depends on the number of category buses and that the switches can be any conventional switch, either manual or automatic, such as a crossbar switch with the contacts of the switches interconnected in any desired individual or composite fashion desired to yield a desired result. The subgroup chart recorders 301, 302, through 310 for recording the categories may be any conventional recorders capable of being adapted to this use.

As discussed in detail hereinafter, each time the master scan counter causes the diode matrix 200 and transistor 207 of FIG. 2A to time division transmit an indication of the subjective reaction of each member of the audience, the inherent effect of inductor 125 and diode 126, which connect the plugboard jack terminals as shown in FIG. 1C, causes the pulse or rating sample which is transmitted through the diode matrix 200 to have a spike on its trailing edge. The spike on the pulse is caused by the well-known inherent characteristics of inductor 125 of FIG. 1C. This spike is also transmitted through each of the conductors 181, 182, 183 and 184 associated with the jack and hence travels through the card switch 240 contacts that are in contact and onto the category buses 261, 262, through 291.

Transformers 340, 341, through 349 couple the D.C. component to the subgroup recorders 301, 302, through 310. Condensers 340a, 341a, through 349a filter the spike. The A.C. component is coupled by transformers 340, 341, through 349 to amplifiers 350, 351, through 359, respectively. In place of coupling by the transformers, coupling to the amplifiers may be made by condensers. With the arrangement described, the signal from the current switches is split into two components, the D.C. component passes through the transformer and is filtered by condensers 261b, 262b, through 291b and then is connected to the subgroup chart recorders. The A.C. component is taken off by the transformer and connected to amplifier 350. The inherent inertia of the single line recorders 210 and 211 of FIG. 2B makes these recorders, as well as the master recorder 106 of FIG. 1A, and the subgroup recorders 301, 302 through 310 of FIG. 3A, substantially nonresponsive to the spike, after filtering by condensers 340a, 341a, etc.

In addition to switches 320, 321, through 329 for the subgroup recorders of FIG. 3A, the category buses 261, 262, through 291 are also interconnected via transformer cable to switches 330, 331, through 339 to provide a count-the-house feature in which the spikes associated with each reaction pulse provide a system for repetitively determining the number of members of the audience in any given category or combination of categories. At the same time the count-the-house feature also provides an overall system checking scheme.

As noted, each of the category buses 261, 262, through 291 is connected through a transformer to an individual appearance on mechanical switches 330, 331, through 339. The outputs of these switches are coupled to amplifiers 350, 351, through 359, respectively. The outputs of the amplifiers are in turn, as illustrated in FIG. 3C, connected to the AND/OR circuit 360. The output 366 of the AND/OR circuit, which is illustrated in detail in FIG. 3C, is fed through time delay circuit 361 to the accumulation counters 362. The accumulation counters 362 are connected to the select and hold circuit 364 which is illustrated in detail in FIG. 4C. A visual indicator 365 is connected to the select and hold circuit 364. A time delay circuit 367 is connected to the accumulation counters 362 and to a pulse delay and shaping circuit 368. The pulse delay and shaping circuit 368 is connected to the select and hold circuit 364, the time delay circuit 367, to the voltage controlled switches of FIG. 4, to the RC delay network of the units and tens SCR networks of FIG. 4C, and to the AND gate 369. The AND gate 369 is connected to the master scan counter through manual count selector switches 369a, b and c. These switches enable any manually selected number of seats to be chosen for a complete scan.

Switches 330, 331 through 339 are connected to circuitry for determining the total number of members in an audience in any given category or combination of categories. If it is found that there is a statistically insufficient number of selected audience members in a given category, then members of a standby audience may be substituted for members of the selected audience, as discussed in connection with FIG. 1A, to provide the number statistically necessary in the desired category. This procedure insures that a valid and sufficiently accurate sample is obtained. The overall circuit also provides apparatus which enables the function of counting the house to be performed. The operation of this circuit will become apparent from the following discussion. Once again, however, it should be obvious that the number of terminals on each of the switches and the number of switches required would depend on the number of category buses and that the switches could be any such conventional switches, either manual or automatic, for example, a crossbar switch, with the contacts of the switches interconnected in any desired fashion to yield a desired result. It should be equally obvious that the appearances on the switches could be interconnected and the switches ganged, etc., to yield any desired composite result.

The spike caused by the inductor 125 associated with the jack connected to each audience rating device is transmitted through a punched category in a row card 220 in the card switch 240, to the category buses 281, and then through each of the selector switches 330, 331, through 339 of FIG. 3B. A.C. coupling by transformers or capacitors which are serially connected with the outputs of the switches will block the D.C. signal appearing on the category buses but will pass the short interval spike. The spike is then amplified by conventional amplifiers 350, 351, through 359, with the outputs of the amplifiers being fed into gate 360, which may be either an AND/OR gate, or in the optimum case, a circuit which may be easily, either manually or automatically, changed from an AND gate to an OR gate. This may be desirable, for example, in situations where it is first desired to use an AND gate to obtain the reactions of categories such as all males over 35 who use electric razors. At a subsequent point in the performance it may be desired to use an OR gate to evaluate the reactions of categories such as all married women or other females over 35. The choice of the gate would depend, of course, on how the category cards of FIG. 2C programmed, i.e., if the cards were programmed on an "or" basis, an OR gate would be used to check the audience and thereby insure that the ratings of all members of the audience are accounted for. Although a chart is not obtained when using a gate to obtain the reactions of categories, an indication of the number of people who fall into any combination of a subgroup is obtained.

One such AND/OR gate which may be used is illustrated in FIG. 3C. In FIG. 3C the inputs to the AND/OR gate 370, 371, through 379 are connected to the base electrodes of NPN transistors 380, 381, through 389, respectively. The collector electrode of transistor 380 is connected through a common load resistor 386 for a source of positive direct potential such as that of multipotential source 100. The emitter electrode of transistor 380 is connected to the selector arm position on switch 390, while the collector electrode is connected to the OFF position of switch 390. The OR position of switch 390 is connected through resistors 382 and 383 to the lower OR position of switch 391 of the following stage. It should perhaps be noted at this point that the AND/OR circuit of FIG. 3 is broken down into stages with the exact number of stages corresponding to the desired number of inputs 370, 371, through 379. The intermediate stages would be identical to the intermediate stage comprising transistor 381 in FIG. 3C.

Returning to the first stage of FIG. 3C, it is seen that the AND position of switch 390 is connected to the upper and lower OFF positions of switch 391. The collector of transistor 381 of the second stage is connected to the upper selector arm of switch 391 while the emitter electrode of transistor 381 is connected to the lower selector arm of switch 391. The upper AND position of switch 391 is connected to the emitter electrode of transistor 380 of the first stage while the lower AND position of switch 391 is connected to the collector electrode of transistor 389 of the succeeding stage, which in FIG. 3C is the last stage.

The emitter of transistor 381 of the second stage is connected to the AND position of switch 399 of the last stage. The OR position of switch 399 of the last stage and the upper OR position of the switch 391 of the second stage are connected to the output 366. The collector of transistor 389 of the last stage is connected to the selector arm of switch 399 while the base is connected to input 379. Limiting resistor 384 and diode 385, poled in the forward conductivity direction, are serially connected between the emitter of transistor 389 and ground. The common connection of resistors 382 and 383 is connected to the common connection of resistor 384 and diode 385.

When the selector switches 390, 391, through 399 are in the OR position, the circuit of FIG. 3C functions as an OR gate, i.e., passes signals corresponding to this, OR this, OR that. When the selector switches are in the AND position, an output signal in lead 366 will be delivered only when input signals corresponding to this, AND this, AND THAT are present. It is possible to remove a stage from the gate simply by setting the selector switch associated with the stage to the OFF position. The removal of one or more of the stages does not interfere with the normal operation of the remaining stages and of the gate in general. It should be noted that it is possible to remove a particular category represented by a particular gate element (by turning the stage selector switch to the OFF position) if it is not desired to have that information in a particular subgroup count.

In the circuit of FIG. 3B, it has been noted that the output of the AND/OR gate is applied to a time delay network 361 which may be any compatible conventional network that will provide the desired time delay, such as, for example, a one-shot multivibrator. The reason for this time delay will be obvious from the following discussion. The output of the time delay network is in turn fed into accumulation counters 362, which may be any such conventional counters that will accumulate the sequential time delayed spikes from the time delay network 361. One such counter is the counter disclosed by FIG. 5 of the copending application noted heretofore. This accumulation counter should be distinguished from the master scan counter discussed in connected with FIG. 2A which, although it may comprise circuitry identical to the accumulation counters 362, serves a separate function. The output of accumulation counters is fed into a select and hold circuit 364 which, when triggered at the end of a complete audience scan, selects and holds the count stored in the accumulation counters 362 until triggered again. The select and hold circuit 364 indicates on the visual indicator 365 the count in the accumulation counters 362 at the time the select and hold circuit 364 was triggered and, additionally, causes the visual indicator to indicate this count until the select and hold circuit is again triggered at the end of a subsequent sequential scan cycle. The schematic details of the select and hold circuit are discussed in greater detail hereinafter in connection with FIG. 4C.

The visual indicator 365 may be any one of a number of conventional configurations which continuously indicate the digits to which the counter has advanced. In one convenient embodiment the indicators comprise eleven transparent plates (not shown) of light conducting substance arranged in stacked order; one of the plates being blank while the remaining ten plates have numerals 0–9 singularly etched on their surface. The stacks are aligned with respect to lamps associated therewith so that the plates are individually edge lighted by the lamps of the stages corresponding to the numerals etched on the plates. Since only the desired digit is illuminated and the remaining plates are dark, the illuminated etched numerals would show through the stack to display the digit to which the counter has advanced. Two or more stacks would be employed depending upon the size of the audience making the evaluation.

The overall operation of the count-the-house circuit of FIG. 3B is as follows: The spikes from the selected audience panel of FIG. 1A which are passed through the card switch 240 of FIG. 2D and the switches 330, 331, through 339 which correspond to the number of audience members in certain selected categories, are passed through the AND/OR gate of FIG. 3C to the time delay network 361, as shown in FIG. 3B. As also can be seen from FIG. 3B, the pulses applied to AND gate 369 at the end of each sequential scan of the audience, i.e., once after each diode matrix 200 has been activated, will cause one pulse per complete scan to pass through the AND gate 369. If the counter of the aforenoted copending application were employed, then the pulses which cause the AND gate 369 to be activated and pass an end of sequential scan pulse could be taken from capacitors 92 in the tens and units counters, respectively.

The visual indicator 365 is driven directly by the select-and-hold circuit 364 and the lamps of the visual indicator replace the load resistors 462, as shown in FIG. 4C, for this particular application when it is used on the count-the-house mode of operation. The end of sequential scan pulse from AND gate 369 is applied to pulse shaping and delay circuit 368, which may be any compatible conventional circuit such as, for example, an SCR or resistor-capacitor gating network.

The output pulse from the pulse shaping and delay circuit 368 is fed to a time delay network 367k the select and hold circuit 364 of FIG. 3B, the accumulation counters of FIG. 4A, and the units and tens SCR units of FIG. 4A. The effect of the reset pulse on the units and tens SCR networks of FIG. 4A shall be discussed hereinafter. The pulse from the pulse delay and shaping circuit 368 which is applied to the select and hold circuit 364 causes this circuit to reset, i.e., erase or eliminate the count previously selected and held, and select and hold a new count from the accumulator counters 362 and change the output signal appearing at the visual indicator. This means that the visual indicator only changes its indication whenever the select and hold circuit 364 has been reset to a new condition. The select and hold circuitry and the resetting operation thereof are discussed in detail in connection with FIG. 4C. The output pulse from the pulse delay and shaping circuit is also fed through time delay network 367, to the accumulation counters 362 to reset these counters, i.e., eliminate the old count and prepare for a new count. It should be remembered at this point that the counters 362 count the number of members in the audience in the subgroups selected by the switches 330, 331, through 339.

The events following the passage of the end of sequential scan pulse through AND gate 369 are thus as follows: The end of sequential scan pulse is applied to the pulse delay and shaping circuit 368, which after a time delay, delivers a pulse to the select and hold circuit 364 and the time delay 367. The pulse delivered to select and hold circuit 364 causes this circuit to release the count previously selected and held and, then, select and hold a new count from the accumulator counters 362, as discussed in detail hereinafter in connection with FIG. 4C. It should be remembered that the count is being selected at the end of a sequential scan of each member of the audience and thus represents the total number of members of the audience in the subgroups selected by switches 330, 331, through 339.

The pulse delivered from pulse delay and shaping circuit 368 that is applied to time delay network 367 passes through this time delay network to the accumulation counters 362 to reset the accumulation counters. The time delay prior to resetting of the accumulation counters is sufficient, however, to allow the reset select and hold circuit to select a new count from the accumulation counters. The new count selected and held by the select and hold circuit 364 is then displayed on the visual indicator 365. The time delay network 367 may be any such compatible and conventional network as, for example, a one-shot multivibrator.

The pulse corresponding to the audience members in the subgroups selected by switches 330, 331, through 339 that pass through AND/OR gate 360 are fed into time delay 361. Once again the time delay 361 may be any such compatible conventional network, such as a one-shot multivibrator, that provides a sufficient time delay to allow the aforenoted resetting process to be completed before the first pulse of the new audience scan sequence is fed to the freshly reset accumulation counters 362. An accurate and reliable count is thus provided in keeping with the overall reliability and accuracy objectives of the invention.

It should be noted that by connecting all the category busses to a single appearance on one of the switches 330, 331 through 339, or if the switches are ganged, to a common appearance on each switch, it is possible to obtain a count of the total number of members of the audience (whose ratings devices are functioning properly as discussed hereinafter) since each member of the audience will presumably fall into at least one of the chosen categories.

In the discussion of the diode matrices of FIG. 2A it was noted that the output signal of each of the matrices was in turn transmitted via conductor 206 to the voltage controlled switches 400 of FIG. 4A. The voltage controlled switches 400 are illustrated in detail in FIG. 4B and shall be discussed hereinafter. As can be seen from FIG. 4A, the output of the voltage controlled switches are connected to individual units and tens silicon controlled rectifier (hereinafter referred to as SCR's in accordance with common usage) networks 402, 403, 405, 406, 408, 409, 411 and 412 by way of the accumulation counters 401, 404, 407, and 410. It should be understood that these counters are shown in FIG. 4A with the subjective labels "dull," "normal," "good," and "very good" to correspond to the subjective audience reaction levels on the audience rating devices of FIG. 1B, in both cases only for illustrative purposes with the understanding that any other subjective rating scheme could be used equally as effectively. The voltage controlled switches 400 are also connected to the master scan counter by a locking device 482 and a single-pole, double-throw, center-off switch 429, shown in FIG. 4B, for test purposes as discussed in detail hereinafter. Counter 401 is connected to units and tens SCR networks 402 and 403, respectively; counter 404 is connected to units and tens SCR networks 405 and 406, respectively, counter 407 is connected to units and tens SCR networks 408 and 409, respectively; and counter 410 is connected to units and tens SCR network 411 and 412, respectively. The output of units SCR network 402 is connected through summing resistor 416 with the output of tens SCR network 403, which is connected through summing resistor 417, and then both outputs are combined and connected, through variable summing resistor 418, to one pen of recorder 415 which may be any compatible conventional recorder which presents the information recorded in readily usable statistical form. Similarly, the output of units SCR network 405 is connected through resistor 419, while the output of tens SCR network 406 is connected through resistor 420, with both outputs being combined and connected to a second pen on recorder 415 through variable resistor 421. The output of units SCR network 408 is connected through resistor 422, while the output of tens SCR network 409 is connected through resistor 423, with both outputs combined and connected to a third pen on recorder 415 through variable resistor 424. Finally, the output of units SCR network 411 is connected through resistor 425, while the output of tens SCR network 412 is connected through resistor 426, with both outputs being combined and connected through variable resistor 427 to yet another pen of recorder 415. The pulse shaping and delay circuit 368, which is controlled by the master scan counter is connected to each of accumulation counters 401, 404, 407 and 410, through time delay 367 and also to each of SCR networks 402, 403, 405, 406, 408, 409, 411 and 412. Counter 401 is connected to units and tens SCR networks 402 and 403, respectively; counter 404 is connected to units and tens SCR networks 405 and 406, respecitvely; counter 407 is connected to units and tens SCR networks 408 and 409, respectively; and counter 410 is connected to units and tens SCR networks 411 and 412, respectively.

Only four counters need be provided and recorder 415 need have only four pens for five categories of subjective reactions since the most desired category, or in the subjective examples given the "very good" category, is the maximum signal input condition and hence the full scale line on the recording chart will approximate this rating. With this system, the traces of the pens on the recorder 415 never cross and thus eliminate what heretofore proved to be a source of error. It should be remembered that the count-the-house feature discussed heretofore provides a system to determine that all audience rating devices in the evaluation are working, hence it may therefore safely be assumed that all reactions not counted by counters 401, 404, 407, and 410 will then fall into the most desirable category. This features permits the savings of an extra accumulation counter and associated SCR networks. It should be understood, however, that as discussed heretofore, any number of desired subjective categories may be used and additional counters and associated equipment added to accommodate them in the manner discussed in connection with FIG. 4A. The master scan counter and clock provide a means for determining the goodwill and veracity of the audience as discussed below in connection with the description of the voltage controlled switches 400 and locking device 482, which are shown in FIG. 4B.

As can be seen from the drawing, the circuit of FIG. 4B, which is the schematic representation of the voltage controlled switches 400A, 400B, 400C and 400D of FIG. 4A, is broken down into five stages, namely, A, B, C, B' and D stages wherein the B' stage is the reciprocal of the C stage. Each of the A, B, C, and D stages corresponds to the subjective ratings "good," "normal," "dull" and "very dull," respectively, as will be clearly seen from the following discussion. Since each of stages A, B, C and D are practically identical, the elements in these stages have been given the same numerical designations. Except where noted otherwise, a reference to an element by its numerical designation refers to the element in each of stages A, B, C and D.

The operation of the circuit of FIG. 4B can best be understood by recalling that the rating of each individual member of the audience is measured by the magnitude of the potential delivered by the rating devices to the selected audience jacks 161, and is then effectively transmitted through diode matrices 200 to the voltage controlled switches 400. The input or common conductor 206 is also fed through resistors 434 to the base electrode of normally conductive transistors 431 in each of stages A, B, C and D of FIG. 4B. If the bias on the base of transistor 341, for example, exceeds the level of the cathode of diode 441, transistors 431 and 432 conduct and transistor 433 is cut off.

The output signal from the diode matrices 200 of FIG. 2A are, as discussed, interconnected and fed via a single conductor 206 to each of stages A, B, C, and D of the voltage controlled switches 400A, 400B, 400C and 400D. As connected by conductor 206 extending from the matrices, the output signal from the matrices and the input to the voltage controlled switches is a varying D.C. level. It will have a different value for each input position as the input position is scanned by the clock if the clock is working. If the clock is not working, line 206 carries a D.C. bias voltage that can go from zero to 100%. The same voltage range is also supplied by the voltage divider 481. The voltage on line 206 is compared with the voltage derived from the voltage divider 481 by using the diodes 441, 442, and 444. In actual practice, stage B is similarly biased except that the diode in this case is the base-to-emitter junction of transistor 445. If stage B is considered controlled in this manner, then all four of the stages A, B, C and D are controlled by the threshold, set on the multipotential source or divider 481 and applied through a diode to the emitter of each of the transistors 431. Thus in one case the diode is the diode junction of transistor 445 and in the other case it is a separate diode.

The diodes 440 and 440a are used as biasing diodes to handle the logic at this point. Transistors 431 and 432 are actually a form of flip-flop or can be considered as a trigger. If the voltage level on the input line 206 is below the voltage levels established by the reference point 481 through the diodes to the transistors 436, then no conduction will take place in either transistors 431 or 432. The feed-back resistor 435 gives a snap action to the device to eliminate ambiguity. Thus, when the voltage level on line 206 increases from zero in a positive sense, it first fires the transistor 431 in the D stage and this causes the combination flip-flop type of action which is similar to the action of a Schmidt trigger. Due to the positive feed-back. the circuit becomes a bi-stable device. Consequently it will stay in one condition without loading the input line appreciably because of the balance of resistances between resistors 435 and 434. Thus, very little energy is taken from line 206 to keep the circuit turned on.

Since there is no resistor between the collector of transistor 431 and the base of transistor 432, the necessary resistance in voltage drop between these two units is essentially caused to occur across the emitter-to-collector terminals of transistor 431 and resistor 436 so that after transistor 431 has fired, it acts, as far as the loading of line 206 is concerned, as an emitter follower. As a result, the emitter of transistor 431 follows line 206 up and down in voltage so long as the voltage of line 206 is greater than the biasing that is applied by divider 481. The second transistor 432, once it is turned on, will stay on until the time at which the voltage on line 206 drops below the balancing voltage from voltage divider 481. Thus it has a snap action in that it goes on and it stays on. A bias is formed between the base and the emitter of the transistor 432 by the forward conduction voltage drop of a silicon diode 440. Diodes 440 and 440a are supplied by resistor 450. Even though none of the stages is conducting, there is current flowing through these two diodes and consequently a bias is maintained across each of these diodes. As a result, there is a bias that needs to be overcome between the base of transistor 432 and the emitter of transistor 432 before it will snap on. This prevents sluggish operation, adds to the snap action technique, and prevents thermal runaway.

FIG. 4B shows a plurality of voltage controlled switches. A series of pulses coming in from pulse shaping and delay circuit 601 is applied through resistor 438 to all of the output transistors 433. This is a negative going pulse which is very accurately timed and delayed. The accuracy is basically in the delay. The pulse that is applied to resistors 438 has a large swing in the negative direction. The leading edge of this pulse is delayed for a time which is greater than that which would be required to reset all of the circuits described in FIG. 4C. After they have been reset, the accumulation counters 401, 404, and 407 have to be reset. Until both of these functions have been accomplished, it is not practical to apply the pulse which is generated by the clock to resistors 438 and through them to transistors 433.

The negative pulse is delayed for a relatively long time. By using components capable of higher speeds, the delay can be made much shorter. The whole resetting operation, both in the SCR's and the units and tens accumulation counters, has to be accomplished before the pulse is delivered from the clock circuit. The pulse from thec lock circuit is biased in such a manner that the transistor 433 is out off during most of its operation, that is to say, the value of the D.C. voltage on this line connected to resistor 438 is more positive than the bias supplied by the two diodes 440 and 440a. This maintains transistor 433 thoroughly cut off. It normally holds the diodes 437 in a back-biased or nonoperative condition. Transistor 433 is only slightly back-biased, and it is this degree of interrelationship of biasing that is critical in the operation of the voltage controlled switches.

When in operation the negative going pulse comes in and is applied through resistor 438, it causes transistor 433 to conduct only if transistors 431 and 432 are not conducting. If this bi-stable stage of transistors 431 and 432 is in its off position, then the voltage on the collector of transistor 432 will be essentially negative. For even large swings of negative pulses applied to resistor 438 and thereby to the base of transistor 433, the diode 437 will remain nonconductive. If, however, transistors 431 and 432 are conducting by virtue of the D.C. level applied to line 206, then the collector of transistor 432 is turned on and the voltage is actually plus with respect to the voltage drop across the biasing diode 441 and the emitter of transistor 433. This forward-biases the diode 437. The pulses are still applied regularly from the clock to one end of resistors 438, but instead of being permitted to turn on transistor 433, they are simply conducted through diode 437 and through the saturated transistor 432 to the junction of the two diodes 440 and 440a. The voltage on the base of transistor 433 never does become negative enough to cause this transistor to conduct.

The overall operation of each stage, A, B, C, and D, therefore consists of a control on whether the delayed pulse applied to resistor 438 is going to operate the output transistor 433. This in turn is controlled by the voltage level of the input line 206 for any or all of the stages A through D. If the voltage level of line 206 is high enough to cause conduction, that is to overcome the voltage generated by divider 481 and cause conduction of transistor 431 of bi-stable transistors 431 and 432, then the input arriving on line 206 is not transferred out as a pulse through transistor 433 to the respective counters—normal, dull, good and very good.

If the line 206 has a D.C. value that is less than the lowest value of divider 481, which is applied to stage D, then all of the bi-stable circuits including transistors 431 and 432 would be cut off and all of the diodes 437 would be back biased. Consequently, every time a pulse arrives from the clock circuit, that is to say a delayed pulse arrives, it causes a similar but inverted pulse to occur on the collector of transistors 433.

If, on the other hand, the voltage on line 206 is sufficiently positive to overcome all of the bias voltages supplied by divider 481, including the one that is applied to stage A, then the bi-stable transistor pairs, that is transistors 431 and 432, become conductive. The diodes 437 also become conductive and inhibit the pulses applied to resistors 438 from actuating the output transistors 433. No output pulses are then forthcoming for high values of the input level on line 206, when all of the stages A through D are conducting. It should be noted that stage D conducts until the voltage on line 206 has risen to approximately 18 or 20% of the total swing which would be designated as 100% on the chart. For that voltage and for any higher voltage, the bi-stable elements of stage D are turned on and all pulses applied to the resistor 438 associated in that stage are inhibited. As a result, there would be no output signals going to counter 401.

As the voltage becomes higher, stage C becomes conductive in its bi-stable units. A further increase causes stage B to conduct while a still further increase causes stage A to conduct. Such further increases ultimately maintain all four stages in conduction. When the bi-stable elements conduct, the output pulse to the counters 401, 404, 407, and 410 is inhibited and no counts are registered in the accumulation counters for each of the four pens on the graphic recorder.

The collector of transistor 449 is connected to one terminal of single-pole, double-throw, center-off switch 429. The center-off position of switch 429, which, as discussed hereinafter, is the normal operating position, is not connected. The remaining terminal of switch 429 is connected to the collector electrode of transistor 433 of stage C. The common terminal of the switch 429 is connected to a locking device 482, which may be any conventional device such as a self-holding relay, for example, capable of being turned on by a pulse to stop the clock.

A pulse corresponding to the conductive interval of transistor 433 may be delivered to each of counters 401, 404, 407, and 410, respectively, which are connected to the collector electrode of transistors 433. Whether or not a particular counter receives a pulse depends, of course, on the magnitude of the incoming voltage on conductor 206, i.e., which of the bias levels of stages A, B, C, and D are exceeded by this voltage, as discussed heretofore.

Since a "good" rating will cause only counter 401 to register and only counters 401 and 402 will register a "normal" rating, the number of audience members that give a "normal" rating can be determined by subtracting the "normal" number from the "good" number. The "dull" number will be determined by subtracting the "dull" number from the "normal" number registered, and the "very dull" number will be determined by subtracting the "very dull" number registered from the "dull" number registered. The "very good" number can be determined by subtracting the "good" number registered from the total number of members of the audience participating. It should be remembered that the inputs applied to the voltage controlled switches are applied sequentially from the diode matrix 209 via conductor 206 and that transistor 433 of each of stages A, B, C and D will be conductive, if at all, only for the duration of the delayed clock pulse.

By way of example, if everybody had their dial set on "very dull," which would be the very lowest negative voltage that could be applied to line 206, then all of the bi-stable pairs would be cut off and all of the counters would register every clock pulse that was presented to it. This means that all pens of graphic recorder 415 would, therefore, ride clear up at the high or 100% region of the recorder. If on the other hand, all of the dials were set to "very good," then all of the bi-stable units would be fired in all four stages and the outputs of transistor 433 for all stages would be inhibited and no pulses would be applied to any of the pens. Consequently, all of them would draw lines down at the zero part of the graph.

If the voltage on input line 206 is less than, for example, 18% or whatever point is set up on the voltage divider 481 for reference, then none of the bi-stable units is conducting and pulses will be applied to all of the registers. If the voltage of line 206 rises above the threshold set for stage C and these bi-stable units become active, then it will apply pulses to all counters except the "very dull" accumulation counter. When the voltage rises further, for example to 41% which corresponds to the "dull" setting, then all counters except counters 404 and 401 receive pulses. Counters 404 and 401 are then inhibited and do not receive the clock pulse. At the "normal" setting, stage B conducts, for example, at approximately 61%, as determined by adjustment of divider 481, and causes pulses to occur only from stage A and be registered only in counter 401. Until the input voltage on line 206 has passed the 80 to 85% point, for example, which places it in the "very good" condition, the bi-stable units in stage A are the only ones up to that point operating for all conditions. As soon as the voltage on line 206 rises into the "very good" classification, it fires the bi-stable units in stage A and counter 410 ceases to receive any signals. Therefore, if all of the people have their dials set on "very good," any voltage level appearing on line 206, above say 85 to 87%, would therefore be interpreted as "very good."

There is no pen for "very good" and no accumulation counter for "very good." All of the other counters, however, at this level, would register zero, so that all of the pens would be down at the bottom of the chart.

The additive type of graphical presentation of recorder 415 eliminates the crossing of the different traces. Crossing of the traces would be necessary if the total number of people that had their dial set in a given position were to be indicated.

As shown in FIG. 4B, stage D contains the first bi-stable unit to fire and cut off its output, stage C the second, and stage B the third. Thus, when the voltage level at line 206 is approximately 60%, for example, of its full range of operation, stage B', which has been inhibiting all of the output voltages from the collector of transistor 449, begins to supply output pulse voltages. Therefore, any signal on line 206 that is above 60% or wherever the breakpoint is set, will start to put out pulses from there to any higher reading. For anything below 40%, stage B keeps its bi-stable unit including transistors 431 and 432 cut off and thus allows pulses to go out to counter 404. This means that pulses are delivered by transistor 449 for all values of line 206 which are in the "good" or "very good" region, that is, having voltages above 60%. Conversely, pulses are delivered to device 482 from the other side of the switch which is connected to the collector of transistor 433 in the C stage for all values which are below normal, that is, in the "dull" or "very dull" region. Therefore, if the switch 429 is moved to one or the other switch position it will stop the clock with the locking device on anything that is above normal, stage B', or anything that is below normal, stage C.

The locking device 482 of FIG. 4B provides an audience checking system so that an absent, uncooperative or confused member of the selected audience may be eliminated and a member of the standby audience substituted in his place in the manner discussed in detail in connection with FIG. 1. This is done by requesting each member of the audience, before the start of the performance to be rated, to turn his rating device to the extreme right or "very good" position. Those members of the audience who are absent, uncooperative or confused will usually fail to do this. The single-pole, double throw switch 429 is then thrown into the position illustrated in FIG. 4B and the circuit allowed to operate in the usual manner. As discussed heretofore, delayed pulses are then applied to transistors 433, through resistors 438, in each of stages A, B, C, and D. Since the audience rating devices should all be in the extreme right, or "very good" position, transistors 431 of stages A, B, C and D should be normally conductive and transistors 433 normally nonconductive, as discussed heretofore. Since conduction of transistor 431 initiates conduction in transistor 432, which then terminates conduction through transistor 433, the pulses applied through resistor 438 to transistor 433 of stage C will have no effect on transistor 433, which is already biased into cut off by conduction through transistor 432 and diode 437. If, however, a member of the audience is absent, uncooperative or confused, the position of his rating device is usually at the opposite of the requested rating. Hence, as in the present example, if a "very good" rating is requested, the uncooperative or confused person's rating device will usually be in the "dull" or "very dull" position. As discussed heretofore, with the rating device below the "normal" position, transistors 431 and 432 of stage C will be rendered nonconductive and transistor 433 will be rendered conductive upon receipt of the incoming delayed clock pulse. As also discussed heretofore, receipt of this pulse will cause transistor 433 of stage C to provide an output pulse. The sequence of events caused by an audience member giving other than the requested rating thus causes a pulse to be transmitted via single-pole, double-throw switch 429 to the locking device which causes the clock to stop and thereby indicate the exact location of the audience member whose rating device is below the requested position.

The locking device may be any such conventional circuitry as, for example, a relay or SCR with a manual reset means, such as a push button. If desired, an SCR select and hold circuit such as shown in FIG. 4C could be used to provide an automatic indication without the necessity of stopping the clock. A member of the standby audience will then be substituted for the absent, uncooperative or confused member of the selected audience, as discussed in detail in connection with FIG. 1A. The process is then repeated until proper indications are received from all members of the audience. This checking process only takes a very short interval of time because of both the speed of the system and the ease in which a member of the standby audience may be substituted in the place of an absent, uncooperative or confused member of the standby audience.

As a cross check on the above, especially in the case of absent audience members, and to further insure the statistical accuracy of the overall system, each member of the selected audience would, after the request to turn his rating device to the "very good" position, then be asked to turn his rating device to the extreme left or "very dull" position. Switch 429 is now placed in the right-hand or dotted position illustrated, and since there should now be an incoming low voltage pulse from the audience rating device on cable 206 to transistor 431 of stage B, this transistor should be nonconductive. The biasing sources 442 and 443 of stages B and B', respectively, are inversely proportional so that when transistor 431 of stage B is nonconductive, transistors 445 and 446 of stage B' are conductive. Conduction through transistor 446 in turn holds transistor 449 nonconductive in the manner discussed in connection with stages A, B, C and D. As the delayed pulses are applied to transistor 449 from 601, this transistor, which is already nonconductive, will not respond to these pulses and no pulse will be transmitted via switch 429 to the locking device and clock.

If, however, an absent, uncooperative or confused member of the audience has his rating device, as will be the usual case, in the opposite position to the one requested, which in this case would be in the "good" or "very good" rather than "very dull" position, then transistor 431 of stage B will be conductive, transistors 445 and 446 of B' will be nonconductive, and transistor 449 will be conductive. The delayed pulse applied to transistor 449 will now cause this transistor to be conductive so that a pulse is transmitted through single-pole, double-throw switch 429, which is now in the opposite or dotted position to the previous checking position, to the locking device to stop the clock and indicate the location of the absent, uncooperative or confused audience member.

As noted heretofore, the clock stopping circuitry or locking device may be any such conventional circuitry as, for example, a relay with manual reset means such as a push button. The additional members of the selected audience thus shown to be absent, uncooperative or confused may also be eliminated from the evaluations by patching in a member of the standby audience, as discussed in detail in connection with FIG. 1A. If desired, a third check could be obtained by asking each member of the audience to turn his device to the "normal" position and then checking for ratings other than normal by throwing switch 429 to either of its active positions. Any input other than "normal" will operate the locking device on one or the other of the switch positions.

Once these checking tests are completed the single-pole, double-throw switch 429 is thrown into the neutral, center-off position and the normal evaluating process discussed heretofore is begun. It should be remembered at this point that the checking process is completely automatic and the substitution of audience members is easily and quickly made on a plugboard uncluttered with other patches. The whole checking process, therefore, occurs in a relatively short interval of time without the risk of audience annoyance at the delay.

The schematic circuitry of the select and hold circuit 365 of FIG. 3B and the units and tens SCR networks 402, 403, 405, 406, 408, 409, 411, and 412, shown in FIG. 4A, is illustrated in FIG. 4C. FIG. 4C illustrates one block, i.e., either a units or tens SCR block. Each of the other noted blocks would contain similar circuitry.

In FIG. 4C the base electrode of transistor 452 is connected through the time delay network comprising capacitor 451 and resistor 471 to the pulse shaping and delay circuit 368, as discussed heretofore. The base of transistor 452 is also connected to the accumulation counters associated with each SCR network as indicated in FIGS. 3B and 4A of the drawings. Each of SCR's 460 corresponds to an individual units or tens digit, i.e., zero through nine. The emitter of transistor 452 is connected to a source of D.C. positive potential, such as that of multipotential source 100. The collector electrode of transistor 452 is connected through each of resistors 462 to the anode electrode of each of SCR's 460. Zener diode 454, poled in the Zener direction, resistor 455, and diode 456, poled in the forward conductivity direction, are all serially connected from the collector electrode of transistor 452 to a source of D.C. negative potential. Potentiometer 459 is connected from the common terminal of resistor 455 and diode 456 to ground. The wiper arm of potentiometer 459 is connected to the base electrode of transistor 457. Resistor 458 connects the collector electrode of transistor 457 to the common terminal of diode 456 and potentiometer 459. The gate electrodes of each of SCR's 460 are connected through the forward conductivity direction of diodes 461 to the emitter electrode of transistor 457. Resistor 471 is connected from the base electrode of transistor 452 to the common terminal of resistor 455 and diode 456. The common terminal of Zener diode 454 and resistor 455 is connected to the base electrode of transistor 453. The emitter-collector path of transistor 453 is serially connected with resistor 483 from the cathode electrodes of SCR's 460 to the junction of resistor 455 and diode 456. Variable resistor 485 is connected across the output terminals Y—Y. Diode 484 is connected in the forward conductivity direction from the collector electrode of transistor 452 to variable resistor 485. Resistor 486 connects the common terminal of diode 484 and variable resistor 485 to the cathode electrodes of SCR's 460. The remaining terminal of variable resistor 485, which is connected to one output terminal Y, is connected through each of the serially connected networks comprising resistors 463 and diodes 465, poled in the forward conductivity direction, to the anodes of SCR's 460. Resistors 464 connects each of the gate electrodes of SCR's 460 to the respective accumulation counters of FIGS. 3B and 4A represented only by X in FIG. 4C of the drawing.

Before the response of the circuit to a pulse from the pulse shaping and delay circuit on lead 480 can be explained, it is first necessary to examine the normal or quiescent conditions of the circuit. The emitter-base current flow through transistor 452 from the positive source also flows through resistor 471 and forward biased diode 456 to the neagtive source. This emitter base current flow, in turn, causes an emitter-collector current flow through transistor 452 from the source of positive potential, through the emitter-collector path of transistor 452, through Zener diode 454 in the inverse or Zener direction, through resistor 455, and through forward biased diode 456 to the source of negative potential. Thus, both transistor 452 and Zener diode 454 are normally conductive, the latter in the inverse or Zener direction.

A positive pulse will be applied on lead 480 each time the master or scan counter has completed one full sequential cycle, as discussed in connection with FIG. 3B. This positive pulse is transmitted from the circuit 368 through the delay circuit comprising capacitor 451 and resistor 471 to the base electrode of transistor 452 to reset the circuits. The resetting operation of the SCR network of FIG. 4C is easily seen once it is noted that the potential of the pulse causes the voltage at the base of transistor 452 to jump to the positive potential of the pulse, as can be seen from the waveform indicated on the drawing at the base electrode. This positive potential back biases the emitter-base junction of transistor 452 and terminates the emitter-base, and hence the emitter-collector current flow, through transistor 452. Once the emitter-collector current flow through transistor 452 is terminated, the inverse current flow through Zener diode 454 is also terminated and transistor 453 is biased out of conduction, thus removing the cathode bias from each of the SCR's' 460. As capacitor 451 exponentially begins to charge to the magnitude of the potential of the input pulse on conductor 480, however, the voltage at the base electrode of transistor 452, which is essentially the voltage across resistor 471, begins to exponentially decrease until finally capacitor 451 is fully charged and the voltage at the base of transistor 452 is again at its initial or pre-pulse potential, as indicated on the waveform shown on the drawing. At point A in time indicated on the waveform, the potential across the emitter-base path of transistor 452 is such that the forward threshold voltage of the emitter-base path of the transistor is once again exceeded and the transistor is again biased into conduction. At point A, however, although the emitter-base path of transistor 452 is conductive, the potential at the collector electrode of this transistor is not sufficient to cause Zener breakdown in diode 454. As capacitor 451 continues to charge, the potential at the base of transistor 452 continues to become less positive (as can be seen from the waveform indicated on the drawing) until finally point B is reached at which time the voltage at the collector electrode is sufficient to again cause Zener breakdown of the diode 454 and current again flows through this diode in the inverse or Zener direction. Conduction through Zener diode 454 once again biases transistor 453 into conduction to restore the cathode bias to the SCR"s 460.

The composite action of the input pulse on transistor 452 and Zener diode 454 in turn conditions each of SCR's 460 for conduction, i.e., to be fired. Before the pulse is applied to transistor 452, Zener diode 454 is conductive in the inverse direction so that a back-bias potential is applied to each of the cathode electrodes, with respect to the gate electrodes, of the SCR's 460 to prevent accidental firing by the other counters. Conduction through the emitter-collector path of transistor 452 applies a positive potential from the source of positive potential through resistor 462 to each of the anode electrodes of SCR's 460. When the delayed end of scan sequential pulse is initially applied from the pulse shaping and delay circuit 368 to the base electrode of transistor 452, i.e., prior to point A on the waveform of the voltage appearing at the base of transistor 452, both transistor 452 and Zener diode 454 are biased out of conduction, as discussed heretofore. In this interval there is no bias applied via conductive Zener diode 454 to transistor 453 which therefore cuts off and opens the cathode path of the SCR's 460 to terminate conduction through any conducting SCR. Since there is no forward bias applied via the emitter-collector path of transistor 452 to the anode-cathode path of SCR's 460, the termination of conduction through the SCR's is insured and the SCR's are prevented from firing. It should moreover be noted that when the delayed pulse from the pulse shaping and delay circuit is received, transistor 452 becomes nonconductive and the potential at the anode electrodes of the SCR's is removed, so that an SCR which was conductive ceases to conduct and the circuit is now in a cleared condition ready to select and hold a new count, as shall be apparent from the following discussion.

At point A of the waveform illustrated, the voltage at the base of transistor 452 causes the emitter-base path of transistor 452 to be biased into partial conduction and the forward positive bias potential is once again applied via the emitter-collector path of transistor 452 to the anode electrodes of SCR's 460. Once point B of the waveform appearing at the base of transistor 452 is reached, however, Zener diode 454 once again begins to conduct. Transistor 453 is biased fully into conduction to completely close the cathode path of the SCR's 460, and the remaining SCR's which were not fired during the interval Δt between points A and B on the waveform are prevented from firing until another pulse is received on input conductor 480. This firing prevention feature is easily seen once it is remembered that once an SCR is biased into conduction, its anode-cathode voltage drops from the relatively high forward value prior to firing to a relatively low forward voltage drop. Each of SCR's 460 are thus conditioned for firing only during the time interval from point A to B represented by Δt on the waveform representing the voltage appearing at the base of transistor 452. In other words, only a firing potential applied to point X of an SCR 460 during the interval Δt will cause one of the SCR's 460 to conduct and once an SCR is conductive, the other SCR's connected in parallel therewith are prevented from firing until the conductive SCR is once again rendered nonconductive by a pulse on input conductor 480. Once SCR 460 is conductive or "fired" due to a gate cathode firing potential received from an accumulation counter during the interval Δt, the gate-cathode path of the SCR characteristically loses control of the device. Conduction through the conducting SCR will now only be terminated by removing the anode-cathode bias so that the anode-cathode current flow falls below the holding current of the device, i.e., the anode-cathode current necessary to sustain conduction through the device. The SCR's thus continue to conduct until the next end-of-sequential-scan pulse is received from the pulse shaping and delay circuit 368 on conductor 480 such that transistor 452 is cut off and the forward bias is removed from the anode electrodes of each of the SCR's 460. The bias provided through diode 456 guards against the cathode bias going sufficiently low so that noise could cause conduction through one of the SCR's, in addition to the aforenoted noise safeguards.

The foregoing firing and sustaining action of the SCR is easily understood, once it is remembered that the firing of the SCR's is a function of both the anode cathode potential and the magnitude of the gate-cathode firing pulse, whereas once the SCR is thus rendered conductive only a small forward anode-cathode voltage and current flow, i.e., a small holding current is necessary to sustain conduction through the device.

Each of the gate electrodes of SCR's 460 are connected through a current limiting resistor 464 to a respective accumulation counter 362, 401, 404, 407 or 410 indicated by X's on the drawing, as discussed heretofore. As can be seen from FIGS. 3B and 4A, and accumulation counters in turn are connected to category busses 281 and the voltage controlled switches 400, respectively, as well as to the pulse shaping and delay circuit 368 which in turn is connected to the master scan counter and clock as discussed in detail heretofore. Circuit 368 supplies a pulse delay to the network of FIG. 4C, as described, which is only the first of three separate time delays. As soon as point B or a point shortly thereafter, as shown in the voltage curve described on FIG. 4C, has passed, it becomes desirable to reset the accumulation counters back to zero so that they can build up another count. FIG. 3B shows a time delay 367 and this resets the 362 accumulation counter.

A similar time delay is required to reset the counters for the "very dull," "dull" and "normal," that is counters 401, 404, 407 and 410. Another time delay following this second one for resetting the accumulators is the one previously described that needs to be applied to the voltage controlled switches. Thus, not only does the select and hold have to clear and pick up the new number, but the accumulation counters have to be set back to zero before it is possible to put through another pulse that is to be applied to resistors 438 in FIG. 4B.

Once an SCR of FIG. 4C is fired during the interval Δt due to a gate potential from an accumulation counter, current flows from the source of positive potential and through the emitter-collector path of transistor 452 (until this transistor and hence the conducting SCR are turned off by a delayed input pulse), the anode resistor 462, the SCR 460, transistor 453, the resistor 483 and diode 456 to the negative supply of FIG. 4C. As can be seen from FIG. 4A, the output terminals Y—Y of FIG. 4C are connected across the anode resistor 462 through diodes 464 and 465 and resistor 463. They also connect through individual current limiting resistors to a pen or stylus of recorder 415. Each of resistors 463 associated with each of the SCR's 460 of FIG. 4C are of a different resistive magnitude so the current flow at the output terminals Y—Y due to conduction through, for example, the first SCR of the tens block which represents the range of 10 to 19, will be less than the current flow at the output terminals when the next succeeding SCR, representing the range in 20 to 29, is conductive and so on through any desired number of stages.

Bias level diodes 461 are each connected in the forward conductivity direction from the gate electrodes of SCR's 460 to a network comprising load resistor 469, transistor 457, resistor 458, potentiometer 459, and diode 456, which serve as a constant voltage source to apply a predetermined voltage to the gate electrodes of each of the SCR's, so that the SCR's are conditioned or biased to insure both firing and cut-off, i.e., to insure that the SCR is fired by the potential applied from the accumulation counter associated therewith during Δt, but also that no SCR can be fired at any other time. The precise manner in which the SCR's are controlled, i.e., to fire or conduct only during the interval Δt, insures both reliability and accuracy of firing and guards against an SCR being turned on or off by spurious noise or changing inputs through point X from the counters, as discussed heretofore. As an additional safeguard, potentiometer 459 is set so that the potential applied to the gate electrode bus by emitter follower transistor 457 is such that the potential on the gate electrodes is sufficient to fire th SCR's only during the interval Δt. (It should be remembered that, as noted heretofore, the firing of an SCR is a function of both the anode-cathode and gate-cathode potentials.) These features are, of course, in keeping with the statistical accuracy and simplicity features of the overall invention.

It should be obvious at this point that when a count of less than a hundred is selected and held by the circuit of FIG. 4C, only two SCR's will be conducting, one SCR to represent the tens digit and another to represent the units digit, e.g., for a number of 78 the seven SCR from the tens counter and the eight SCR of the units counter. It should be equally obvious that the SCR's "hold" the count, i.e., remain conducting until a new count is received, and that any conventional visual indicator, such as edge-lighted current responsive type visual indicators noted heretofore, may be connected thereto, as illustrated in FIG. 3B. A lamp of the visual indicator may be connected in series with each of the SCR's in place of resistor 462 to provide the necessary edge-lighting described in connection with the description of the illustrative visual indicator discussed in connection with FIG. 3B. It should be noted that the present evaluation system, in addition to permanently recording the results of the evaluation, also provides FIG. 3B with a "running" visual indication during the performance, as discussed heretofore.

In FIG. 4A, there are shown variable resistors 418, 421, 424 and 427. These resistors are required whenever a count other than a predetermined fixed amount is to be employed. Thus it becomes possible to have an active audience which totals other than a fixed amount such as 100. Whenever this happens, the units and tens SCR's and their resistive networks which consist of the variable resistors 463 must be compensated. Diode 484 connects the collector 452 down to the first terminal Y. In addition, there is a variable resistor 485 between terminals Y and Y. There is another resistor 486 which connects up to the junction of diode 484 and resistor 485 and provides a forward bias on the diode 484 in order to keep it properly biased away from the collector load of transistor 452. The variable resistors 418, 421, 424 and 427 are in reality a means of mathematically dividing the count that was held in a digital form. The count has been accumulated in the accumulators, transferred to the units SCR's, and then by means of the weighting resistors 463 and resistors 416, 417, 419, 420, etc., the digital information shown and held by the selection hold SCR's is converted into analog information. The analog information is then divided mathematically by the variable resistor 418. This is necessary when variable numbers of people are to be in the audience.

For instance, if the audience contains 150 people, a higher total count would be accumulated in each of the units and tens SCR's for all of the accumulation counters. If the audience were to contain 100 people, in turn, the count would be lower. By adjusting the variable resistor 418, the larger count that would be obtained with 150 people can be divided in an analog fashion so that it would give the same full scale reading as if 100 people has set their dials to "very good" or "very dull" or in the case of the apparatus of FIG. 3B, all of the people were in some sort of classification combination that we could set up with the AND/OR gates and the switches 330 through 339.

Therefore, what is being done is to convert the information from analog to digital, add it up in digital accumulators, transfer the information to the SCRs, convert it back with the resistor networks into analog information, and divide it by the 418, 421, 424 or 427 variable resistors, so that a full scale chart representation for any number of people within the range of handling ability on the charts can be made. This analog to digital, back to analog, divide by analog, and record in analog provides a means of integrating the information and presenting it graphically without using a straight analog integration network. The output is not truly analog in as much as the graphical presentation is a series of postings of digital information, but since the clock can be made to scan at very rapid rates as compared with audience reactions, this method of integrating the information and presenting it in an analog graphical form is quite satisfactory for most purposes.

It should be obvious that although the voltage control switches of FIG. 4B and the select and hold devices of FIG. 4C illustrate circuitry using transistors and SCRs, other such circuit elements could be substituted therefor without departing from the spirit and scope of the invention.

Figure 5B:
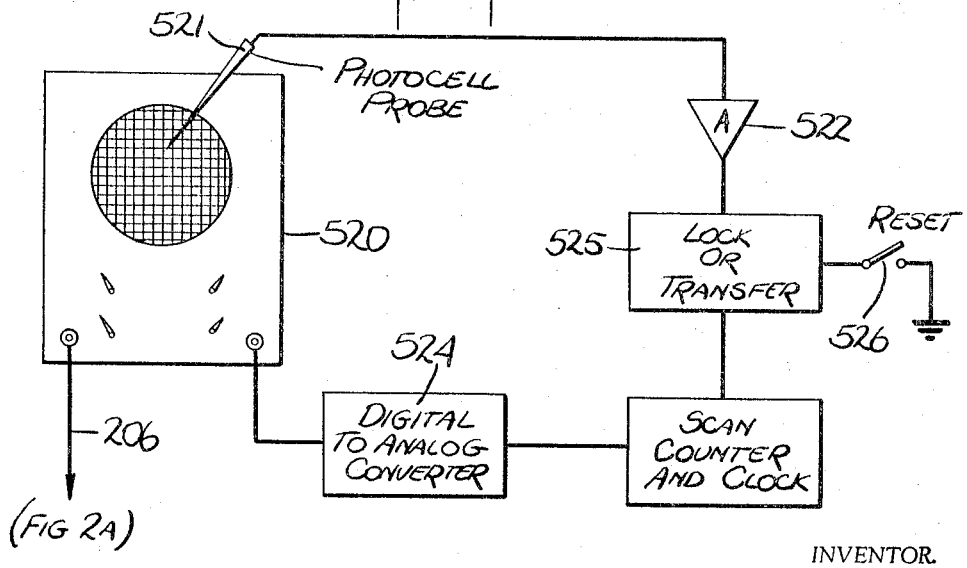
FIG. 5B illustrates a system by which an absent, overly demonstrative, confused, or uncooperative member of the audience may be quickly and easily located.

FIG. 5A illustrates two valuable adjuncts to the overall system. FIG. 5A illustrates a cue tape unit, i.e., a unit which provides an indication of a particular event in the performance so that the audience reaction or rating of the particular event may be evaluated. FIG. 5B illustrates a system whereby an individual member of the audience, whose reactions are of particular interest for one reason or another, may be easily located, observed, and if necessary, replaced.

In FIG. 5A, a push button 501 manually controlled by an operator connects the start control of a two track reproducer 500 to ground. An amplifier 502, a blocking diode 504, and the winding of relay 503 are serially connected between the two track tape reproducer 500 and ground. A break contact on relay 503 provides a reset function connection from two-track tape reproducer 500 to ground.

A pair of earphones or speakers 505 are connected to one track 513 of the two-track reproducer 500. Both tracks are also connected to the mixer 506, which is in turn connected to a microphone 508, a conventional tape recorder 507, and, if desired, to the theater sound track.

The second remaining track 512 of two-track tape reproducer 500 is serially connected through a filter 509, an amplifier 510, and a rectifier 511 to the cue or event pens of audience reaction recorder 415 of FIG. 4A. This second track is also connected to the mixer 506, the reasons for which shall become obvious from the following discussion.

The two track tape reproducer may be any such reproducer capable of reproducing two tones and a verbal cue and, additionally, after the announcement of a cue, quickly stopping until reactivated once again by the manual operation of pushbutton 501. The reproducer should also be capable of being automatically reset at the end of all the cues on the tape being reproduced, i.e., the tape used is usually a continuous tape with a fixed number of cues thereon which, after one cycle, would be repeated or recycled. Thus an operator listening to the track 513 which could, for example, carry verbal announcements such as, cue one, cue two, etc., would push button 501 to have the verbal announcement fed into mixer 506 and then into tape recorder 507 (which may be any conventional recorder) at a significant point in the performance. After the verbal announcement, the reproducer would stop and await actuation by the depression of button 501 to announce the next cue. The mixer 506, which may be any conventional patching network, is also usually connected to the theater soundtrack so that the action occurring in the theater is recorded with the announcement of the cue to provide a reproducible indication of the event corresponding to the cue. During periods when the soundtrack is silent, the event corresponding to the cue is orally announced by the operator controlling the cues into microphone 508 as a substitute for the function usually provided by the theater soundtrack.

The remaining track 512 of the two-track reproducer 500 comprises a series of bursts of tones, each burst of tone corresponding to a verbal cue announcement. These bursts of tones are fed into filter 509, which passes only the tones of the desired frequency and guards against undesired actuation of the network by spurious signals. The output of the filter 509 is amplified by conventional amplifier 510 and fed into a conventional rectifier 511 to be rectified. The output of rectifier 511 is connected to the events or cue pens on audience reaction recorder 415 of FIG. 4A to provide a mark of indication on the permanent recording made by recorder 415 corresponding to a particular cue.

The cue mark is also made on the master chart recorder 106 and on each of the sub-chart recorders 301 through 310, each of which have events pens. All of the events pens are wired in parallel and whenever any actuation of the circuit takes place, the event pens of each of the chart recorders have the same movement. This technique provides absolute synchronism for future comparison of one set of charts against any of the other sets of charts.

Subsequent to the performance, a typist listening to the tape recorder 507 would type the event corresponding to the cue mark on the recording graph of recorder 415 to show the reaction of the audience to the particular event in the performance. To facilitate this process the burst of tones on track 512 are also fed into mixer 506 so that the burst of tones warns the typist, as well as the operator controlling the cues during the performance, that the verbal cue follows. By varying the length of the tones, distinctive markings by the output cue pens may be correlated to the announced cue numbers. In actual practice, a tone that is approximately a second long can be used to actuate the cue pens for most numbers, but for every ten, twentieth, thirtieth, etc., cue mark, the tone is made twice as long. This produces a distinctive marking of the pens. Furthermore, the tones can also be coded so that there are long and short marks for each one, that is, each identifiable cue. Since the long and short marks occur on all of the charts simultaneously and since they are easily recognizable by the length of tone, a typist is enabled to identify the cue position accurately with the marks on the graphs and the audible cue that can be typed onto the graphs later while using the marks as a guide.

Tape reproducer 500 also may provide a continuous tone for the duration of the tape, i.e., a tone that stops when the tape is finished. This tone is fed through amplifier 502 and diode 504 to the winding of normally open relay 503. When the tone disappears at the end of the tape, the relay 503 releases and stops the recorder 500, at the start mark of the tape loop. Momentary push switch 503a is used to initiate the reset cycle by pulling in relay 503. Amplifier 502 can provide enough output to hold in relay 503, but it cannot pull it in unless aided by switch 503a. The reset tone can be, for example, a 30-cycle frequency that will remain until the end of the tape. When a continuous tape is used, one section of the tape, just before the beginning, has no 30-cycle tone while the rest of the tape has the tone. The 30 cycle tone is not reproduced in the speakers which are used for monitoring, due to their small size, and consequently it is not heard and it is not recorded on any other tape. Yet the tone serves to hold in relay 503 during reset of the cue tape, which may contain one hundred cues, back to cue number one whenever it is desired to start the next test.

Although a pushbutton 501 is shown as a device to advance the reproducer 500 from cue to cue, it can be understood that other devices may be employed to start the reproducer on an automatic basis. It should be equally obvious that the reset operation can be achieved by other means if so desired.

In the circuit of FIG. 5B of the output conductor 206 of the diode matrices 200 of FIG. 2A is connected to one input channel of a conventional cathode ray oscilloscope 520 hereinafter referred to simply as CRO. The other input channel of the CRO 520 is connected to a digital-to-analog converter 524 which may be any such conventional network, with perhaps the simplest form being a proportioned resistive current integrating network. The converter 524 is in turn connected to the master scan counter and clock discussed heretofore in connection with FIGS. 2A, 3B, and 4. A photocell probe 521 is connected to amplifier 522, while the output of the amplifier is connected to the master scan counter and clock.

The degree or magnitude of the rating of each member of the audience appears, due to the manner in which the input channels of the CRO are connected, as a dot on the cathode ray tube. The presentation on the cathode ray tube as the master scan counter sequentially scans is, therefore, a series of dots (due to the inherent retentiveness of the cathode ray tube) with varying vertical position, each dot corresponding to an individual audience member. If the reaction of a member of the audience is noteworthy for any reason, it is possible to locate this member by placing the photocell or detection end of the photocell probe 521 on the cathode ray tube screen on the trace of interest when it appears. The photocell is then activated by the light of the trace and transmits a signal to the amplifier 522, the amplified output of which is sent to the lock or transfer circuit 525 and the master scan counter and clock to stop the clock in the manner discussed in connection with FIG. 4B. The clock will then be stopped by the lock or transfer circuit 525 to indicate the seat location of the audience member of interest.

The lock may be any conventional circuit capable of stopping the clock until manually reset by switch 526, such as, for example an SCR circuit. This feature is particularly useful in situations where the audience member has left the performance or has become confused, fatigued or uncooperative after the evaluation of the performance has begun. Once the seat number of this audience member is located in the above described manner, a member of the standby audience may be easily substituted in his place, as discussed in detail heretofore. Additionally, this scheme may be used to select members of the audience of particular interest who then may be connected to the single line recorders 210 and 211 of FIG. 2B to permanently record their ratings, as also discussed heretofore. It should be obvious that a select and hold circuit and visual indicator such as blocks 364 and 365 in FIG. 3B, respectively, could be added at the output of the amplifier 522 to indicate the location of an audience member of interest, so that this member would be located without stopping the clock. (Under some conditions stopping the clock would interfere with the other rating evaluations discussed heretofore.)

It should also be noted that the configuration of FIG. 5B provides a system to insure that all of the audience rating devices are working properly since an open circuited rating device would cause the dot trace or the cathode ray oscilloscope to be above the maximum rating value whereas a short-circuited device would cause the dot trace to be below the minimum value. This feature is, of course, in keeping with the overall statistical reliability and accuracy objects of the present invention.

In summary, a short description of the overall system appears to be helpful. Briefly, each member of the audience has an individual rating device 123 on which to indicate his subjective reactions to the subject being evaluated. The output of the rating devices is a voltage, the magnitude of which is proportional to the rating given. The rating is transmitted from the rating device to a prewired plugboard with each seat or member of the selected audience having an appearance on panel 161, and each of the remaining or standby audience members having an appearance on standby audience panel 162, which is also prewired. A telephone type cord patch, such as 195 in FIG. 1A, is used to easily substitute members of the standby audience for an absent uncooperative or confused member of the selected audience. Each of the jacks on the selected audience panel 161 is prewired to four separate outputs namely, diode matrix 200 (FIG. 2A), single line recorder 210 and 211 (FIG. 2B), a master chart or composite recorder 106 (FIG. 1A), and a card switch 240 (FIG. 2D).

Diode matrix 200 produces a D.C. voltage which is directly proportional to the dial position of each person using a rating device 123. The matrix signals are converted into pulses by reason of the multiplex system. In certain instances, the D.C. signals of the matrices are used as such. Thus, diode matrix 209 in combination with the master scan counter, causes a signal having a magnitude proportional to the rating of each member of the audience connected to the selected audience panel to be transmitted as a pulse, with the reactions of each of the members of the audience being transmitted as a sequential series of short duration pulses with varying individual voltage magnitudes that are proportional to the individual rating of each member of the audience. The single line recorders, which are connected through selection switches 211 and 212, record the output of individual members of the audience selected by switches 211 and 212 of FIG. 2B. The card or selection switch 240 (FIG. 2D) selects the members of the audience in certain desired categories and provides an automatic, hence simple and efficient, system of dividing the audience into desired categorical subgroups, so that the reactions of these subgroups may be quickly and easily determined and permanently recorded. The output 281 of the card switch of FIG. 2D, which is the ratings given by audience members in selected categorical subgroups, is connected to two banks of switches, namely switches 320 through 329 of FIG. 3A, and switches 330 through 339 of FIG. 3B.

The output of switches 320 through 329 of FIG. 3A are connected to subgroup recorders 301 through 310 to permanently record the ratings of the selected subgroups. The outputs of switches 330 through 339 of FIG. 3B are connected via transformers 340 through 349 and amplifiers 350 through 359 to the gate 360 which may be an AND/OR gate. Transformers 340 through 349 will pass only the spikes transmitted when the rating of each member of the audience is sequentially sampled. These spikes are generated by an inductor and diode connected to each jack of the selected audience panel 161. As noted, the spikes pass through transformers 340 through 349 of the gate 360 and are fed into accumulation counters, a select and hold network, and visual indicator combination to indicate the number of members of the audience in the categorical subgroups selected by switches 330 through 339. This combination thus provides a method for insuring that there are a given desired number of audience members in any desired subgroup, i.e., if there is not the desired number of the selected audience members in any given subgroup then members of the standby audience are substituted until the desired number is reached. After checking out the number of members in combined subgroups, it is possible to replace them, if necessary, with members of the standby audience in order to obtain a subgroup which accurately corresponds to whatever sample system is being used. It would require a great deal of time, for instance, to determine out of 150 selected members and 50 standby members, how many women over a given age did use hair coloring. In this way, the time required for determining whether the sample is correct or not can be greatly reduced.

The whole "count-the-house" system as shown in FIG. 3B is directed toward the obtaining of statistically accurate collection of statistically valid samples for combination of subgroups. This is especially the case when there are ten such subgroup information bits and there are for example a great remaining possible combination of subgroups and it is desired to handle this information rapidly without keeping the audience waiting.

The single line output of the diode matrices 200 of FIG. 2A is also fed into voltage controlled switches 400 of FIG. 4A which are schematically illustrated in detail in FIG. 4B. These switches initially provide a system for checking for absent uncooperative or confused members of the selected audience so that members of the standby audience may be substituted therefor. Once this initial checking process is completed the voltage controlled switches then segregate the voltage magnitude representation of the subjective ratings of all the audience members to the performance and feeds them into accumulating counters so that the number of audience members with a given rating may be recorded. The count accumulated in each of these counters is in turn fed into units and tens select and hold SCR networks which are schematically illustrated in detail on FIG. 4C. The outputs of the select and hold SCR networks in turn drive the pens of permanent chart recorder 415 of FIG. 4A.

The cue tape unit of FIG. 5A provides correlating records between the audience ratings and the events that stimulated the rating. The cathode ray oscilloscope unit of FIG. 5B permits a simple and quick determination of the location of an audience member whose rating is of special interest. It is very desirable to be able to indicate graphically in a very visual manner the individual reactions of each member of the audience. Each member of the audience has an individual dot position which can be moved up and down. This makes it graphically easy to locate a person for example who is different from the overall audience. The addition of locking device 482 to the oscilloscope provides easy identification of the particular member. However whether it is desired to identify the member or not the visual analog indication of every person being analyzed on a long persistence cathode ray oscilloscope screen can be of great value. Such a presentation enables persons to be found who are switching their dials from one side to another or otherwise using the device improperly. Such a movement of the dials shows up not as dots but as slanted lines. Consequently such persons can be excluded from the study.

The above-described arrangement is illustrative of the principles of the invention. Other embodiments may be devised by those skilled in the art without departing from the spirit and scope of the invention.

What is claimed is:

1. A system for measuring the response of an audience to an occurrence comprising a plurality of rating devices individually distributable to members of said audience, each of said devices having means for producing a signal indicative of the response of an audience member to an occurrence, a plurality of channels corresponding to the plurality of categories into which the audience is divisible, means for selecting the categories of said plurality of categories related to each audience member, means responsive to said selecting means for connecting the signal of each of said rating devices of each audience member to the channels of said plurality thereof corresponding to the categories related to the audience member, and means connected to said plurality of channels for processing the signals thereon, whereby the signals from the rating device can be processed in term of the categories.

2. A system in accordance with claim 1 in which said means for selecting the categories of said plurality of categories related to each audience member includes a code representation of the categories related to each audience member.

3. A system in accordance with claim 1 in which said means responsive to said selecting means for connecting the signal of each of said rating devices of each audience member to the channels of said plurality thereof corresponding to the categories related to the audience member includes a plurality of switches actuated in response to said selecting means for connecting the signal of each of said rating devices of each audience member to the channels of said plurality thereof corresponding to the categories related to the audience member.

4. A system in accordance with claim 1 in which said means connected to said plurality of channels for processing the signals thereon includes means for producing a record in response to the signals transmitted by a channel of said plurality thereof, and means for determining the channel of said plurality which is to be connected to said record producing means.

5. A system for measuring the response of an audience to a performance comprising a plurality of rating devices individually distributable to members of said audience, each of said rating devices having means for deriving information indicative of the opinion of an audience member to said performance, a plurality of information channels corresponding to categories into which said audience is divisible, sorting means for automatically transferring information derived by each of said rating devices to a plurality of said information channels, and means for indicating the information transferred to each of said channels.

6. A system for measuring the response of an audience to a performance comprising a plurality of rating devices individually distributable to members of said audience, each of said rating devices comprising means for providing an electrical signal to an output terminal indicative of the opinion of an audience member to said performance, a plurality of electrical information channels corresponding to categories into which said audience is divisible, switching means for selectively and automatically connecting the electrical signals appearing at each output terminal to a plurality of said channels, and means for indicating the information transferred to each of said channels.

7. A system for measuring the response of an audience to a performance comprising a plurality of rating devices, each member of at least a group of said audience having an individual one of said rating devices, a selection circuit for automatically categorizing the ratings of each member of said audience into desired subgroups continuously during said performance, said selection circuit being responsive to predetermined category information for each member of said audience having a rating device, means for connecting each of said audience rating devices to said selection circuit, and indicating means connected to said selection circuit to indicate the ratings of members of any of said desired subgroups at any point in the performance, whereby accurate reaction data of any desired audience subgroup may be obtained.

8. A system for measuring the response of an audience to an occurrence comprising a plurality of rating devices individually distributable to members of said audience, each of said devices having means for producing a signal indicative of the response of an audience member to an occurrence, means for applying an identifying signal to the signal of each of said rating devices, a plurality of channels corresponding to the plurality of categories into which the audience is divisible, means for selecting the categories of said plurality of categories related to each audience member, means responsive to said selecting means for connecting the signal of each of said rating devices of each audience member to the channels of said plurality thereof corresponding to the categories related to the audience member, and means connected to at least one of said plurality of channels for counting the identifying signals thereon, whereby the number of the rating devices connected to said one channel can be determined.

9. A system for measuring the response of an audience to an occurrence comprising a plurality of rating devices individually distributable to members of said audience, each of said devices having means for producing a signal indicative of the response of an audience member to an occurrence, means for sequentially gating the signal of each of said plurality of rating devices to an output circuit, means responsive to the gating of the signal of each of said plurality of rating devices for applying an identifying signal to the signal of each of said rating devices, a plurality of channels corresponding to the plurality of categories into which the audience is divisible, means for selecting the categories of said plurality of categories related to each audience member, means responsive to said selecting means for connecting the signal of each of said rating devices of each audience member to the channels of said plurality thereof, corresponding to the categories related to the audience member, and means connected to at least one of said plurality of channels for counting the identifying signals thereon, whereby the number of the rating devices connected to said one channel can be determined.

10. A system for measuring the response of an audience to an occurrence comprising a plurality of rating devices individually distributable to members of said audience, each of said devices having means for producing a signal indicative of the response of an audience member to an occurrence, means for sequentially applying an identifying signal to each of said rating devices, a plurality of channels corresponding to the plurality of categories into which the audience is divisible, means for selecting the categories of said plurality of categories related to each audience member, means responsive to said selecting means for connecting the signal of each of said rating devices of each audience member to the channels of said plurality thereof, channels corresponding to the categories related to the audience member, means connected to at least a pair of said plurality of channels for combining the identifying signals thereon, and means for counting the identifying signals from said combining means, whereby the number of the rating device connected to said pair of channels can be determined.

11. A system for measuring the response of an audience to an occurrence comprising a plurality of rating devices individually distributable to members of said audience, each of said devices having means for producing a signal indicative of the response of an audience member to an occurrence, means for sequentially applying a clock pulse to each of said rating devices at predetermined time intervals, a plurality of channels corresponding to the plurality of categories into which the audience is divisible, means for selecting the categories of said plurality of categories related to each audience member, means responsive to said selecting means for connecting the signal of each of said rating devices of each audience member to the channels of said plurality thereof corresponding to the categories related to the audience member, means connected to at least one of said plurality of channels for counting the identifying signals thereon, and means responsive to the applying of a clock pulse to each of said rating devices for terminating the count of said counting means, whereby the number of the rating devices can be connected to said one channel and can be determined.

12. A system for measuring the response of a selected audience to a performance comprising a first plurality of rating devices, each member of said selected audience having an individual one of said rating devices, a second plurality of rating devices for a standby audience, each member of said standby audience having an individual one of said second plurality of rating devices, a selection circuit for automatically categorizing the reaction of each member of said selected and said standby audience into desired subgroups continuously during said performance, said selector circuit being responsive to predetermined category information for each member of said selected and said standby audiences, means for connecting each of said selected audience rating devices to said selection circuit, a counter circuit, means connecting said counter circuit to said selection circuit to determine the number of selected audience members in said desired subgroups, and means for easily substituting members of said standby audience for members of said selected audience when said counter circuit indicates less than a desired number of selected audience members in a desired subgroup.

13. A system for measuring the response of an audience in accordance with claim 12 wherein said selection circuit comprises selected and standby audience card switches connected so that when a member of said standby audience is substituted for a member of said selected audience the rating device of said standby audience member is connected through said standby card switch to said counter circuit to provide a statistically desirable number of audience members in a desired subgroup.

14. An audience reaction system for measuring the response of an audience comprising a plurality of rating devices, each member of said audience having an individual one of said rating devices, a plurality of cards categorizing each member of said audience into desired subgroups, a card switch responsive to the category information on said cards, means for connecting each of said audience rating devices to said card switch to categorize the reaction of audience members into a plurality of subgroup outputs, a plurality of switches, means connecting each of said plurality of subgroup outputs to at least one appearance on said plurality of switches, a plurality of subgroup recorders, and means connecting an individual one of said plurality of recorders to an individual one of said plurality of switches so that the ratings of the subgroups selected by said plurality of switches may be permanently recorded.

15. An audience reaction system for counting the number of audience members in any of a desired plurality of categorical subgroups comprising a plurality of rating devices, each member of said audience having an individual one of said rating devices, a plurality of pulse generating networks, each of said rating devices having an individual one of said plurality of pulse generating networks connected to and associated therewith, a plurality of cards categorizing each member of said audience into desired subgroups, a card switch responsive to the category information on said cards, means for connecting said card switch to each of said pulse generating networks, said card switching having a plurality of outputs corresponding to said categorized subgroups, a plurality of switches, a gating circuit, means for connecting each of said plurality of card switch outputs to at least one appearance on said plurality of switches, means for connecting the outputs of each of said plurality of switches to said gating circuit, a subgroup counter, and means for connecting said counter to said gating circuit so that the pulses sequentially generated by said pulse generating network and transmitted through said card switch to the categorized subgroup outputs of said card switch and then through said plurality of switches may be counted, whereby the number of audience members in a given subgroup may be determined.

16. A system for measuring the response of an audience to an occurrence comprising a plurality of rating devices individually distributable to members of said audience, each of said devices having means for producing a signal indicative of the response of an audience member to an occurrence, means for sequentially sampling the signal of each of said plurality of rating devices, a plurality of means connected to said sampling means for responding to a different predetermined signal which corresponds to a different response of the audience member, and means connected to said plurality of responding means for indicating a signal other than a predetermined signal which corresponds to a commanded response of all members of said audience, whereby an audience member failing to conform to the commanded response can be identified.

17. An audience reaction system for measuring and recording the reaction of an audience comprising a plurality of audience rating devices each having a voltage output of a magnitude proportional to the subjective rating of a performance by an individual audience member, each member of said audience having an individual one of said rating devices, a master scan counter circuit, voltage responsive means, a plurality of diode matrices having their outputs connected to form a single output, means connecting each of said rating devices to an individual diode matrix, means connecting said diode matrices output to said voltage responsive means, means connecting each of said diode matrices to said master counter circuit, said diode matrices being sequentially responsive to said master counter to sequentially transmit a signal proportional to the subjective rating output voltage of each rating device to said voltage responsive means, a plurality of accumulation counters, means connecting said voltage responsive means to each accumulation counter of said plurality of accumulation counters to sequentially activate one or more of said accumulation counters when a rating signal above a predetermined magnitude is transmitted to said voltage responsive means from said diode matrices, a plurality of units select and hold circuits, a plurality of tens select and hold circuits, means connecting an individual one of each of said tens and said units select and hold circuits to an individual one of said plurality of accumulation counter circuits, a recorder having a plurality of pens, and means connecting the outputs of the units and tens select and hold circuits associated with each of said accumulation counters to an individual one of said plurality of pens, whereby the number of audience members expressing a given reaction represented by the displacement of each pen on said recorder may be recorded.

18. A system for measuring the response of an audience to an occurrence comprising a plurality of rating devices individually distributable to members of said audience, each of said devices having means for producing a signal indicative of the response of an audience member to an occurrence, means for sequentially applying an identifying signal to each of said rating devices, a plurality of channels corresponding to the plurality of categories into which the audience is divisible, means for selecting the categories of said plurality of categories related to each audience member, means responsive to said selecting means for connecting the signal of each of said rating devices of each audience member to the channels of said plurality thereof corresponding to the categories related to the audience member, means connected to at least one of said plurality of channels for counting the identifying signals thereon in order that the number of the rating devices can be connected to said one channel and be determined in a digital manner, and means connected to at least one of said plurality of channels for presenting the signals thereon in order that the output of the rating devices connected to said one channel can be determined in an analog manner.

19. An audience reaction system comprising a plurality of select and hold circuits and a plurality of accumulation counters connected to audience rating devices to count the number of audience members with a given subjective reaction, means connecting each of said plurality of select and hold circuits to an individual one of said plurality of accumulation counters, indicating means, means connecting said indicating means to said select and hold circuits so that the number of audience members with a given reaction may be visually determined at any time, a master scan counter, and means connecting said master scan counter to each of said plurality of select and hold circuits, said select and hold circuits being responsive only to a simultaneous activation by said master and accumulation counters.

20. A system for measuring the response of an audience to an occurrence comprising a plurality of rating devices individually distributable to members of said audience, each of said devices having means for producing a signal indicative of the response of an audience member to an occurrence, means for sequentially sampling the signal of each of said plurality of rating devices, means for providing a light presentation of the sequentially sampled signals, and means connected to said sampling means and selectively activated by the light presentation of said providing means corresponding to one of the sequentially sampled signals for identifying the one of said plurality of rating devices to which the light presentation corresponds.

21. An audience reaction system for measuring and recording the reaction of an audience comprising a plurality of audience rating devices each having a voltage output of a magnitude proportional to the subjective rating of a performance by an individual audience member, each member of said audience having an individual one of said rating devices, a master scan counter circuit, voltage responsive means, a plurality of diode matrices having their outputs connected to form a single output, means connecting each of said rating devices to an individual diode matrix, means connecting said diode matrices output to said voltage responsive means, means connecting each of said diode matrices to said master counter circuit, said diode matrices being sequentially responsive to said master counter to sequentially transmit a signal proportional to the subjective rating output voltage of each rating device to said voltage responsive means, a plurality of accumulation counters, means connecting said voltage responsive means to each accumulation counter of said plurality of accumulation counters to sequentially activate one or more of said accumulation counters when a rating signal above a predetermined magnitude is transmitted to said voltage responsive means from said diode matrices, a plurality of select and hold circuits, the select and hold circuits of said plurality thereof each having a different range of numerical sequence and each having a different multiple of the select and hold circuit of said plurality having the least range of numerical sequences, means connecting an individual one of each of said tens and said units select and hold circuits to an individual one of said plurality of accumulation counter circuits, a recorder having a plurality of pens, and means connecting the outputs of the units and tens select and hold circuits associated with each of said accumulation counters to an individual one of said plurality of pens, whereby the number of audience members expressing a given reaction represented by the displacement of each pen on said recorder may be recorded.

References Cited by the Examiner
UNITED STATES PATENTS

| | | | |
|---|---|---|---|
| 2,712,976 | 7/1955 | Blaustein et al. | 235—52 X |
| 2,861,176 | 11/1958 | Horn et al. | 325—31 |
| 2,878,996 | 3/1959 | Millard | 235—52 |
| 3,126,513 | 3/1964 | Kamen | 346—37 |

RICHARD B. WILKINSON, *Primary Examiner.*

LEO SMILOW, *Examiner.*

C. G. COVELL, J. W. HARTARY, *Assistant Examiners.*